United States Patent
Venkatraman et al.

(10) Patent No.: US 9,584,975 B2
(45) Date of Patent: *Feb. 28, 2017

(54) TECHNIQUES FOR DETERMINING MOVEMENTS BASED ON SENSOR MEASUREMENTS FROM A PLURALITY OF MOBILE DEVICES CO-LOCATED WITH A PERSON

(71) Applicant: QUALCOMM Incorporated, San Diego, CA (US)

(72) Inventors: Sai Pradeep Venkatraman, Santa Clara, CA (US); Weihua Gao, San Jose, CA (US); Benjamin A. Werner, San Carlos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/214,093

(22) Filed: Jul. 19, 2016

(65) Prior Publication Data

US 2016/0330586 A1    Nov. 10, 2016

Related U.S. Application Data

(63) Continuation of application No. 14/323,984, filed on Jul. 3, 2014.

(51) Int. Cl.
*H04W 4/02* (2009.01)
*H04M 1/725* (2006.01)
(Continued)

(52) U.S. Cl.
CPC ............ *H04W 4/023* (2013.01); *G01C 21/16* (2013.01); *H04M 1/72569* (2013.01);
(Continued)

(58) Field of Classification Search
CPC ...... H04W 4/023; H04W 4/026; H04W 4/027
See application file for complete search history.

(56) References Cited

U.S. PATENT DOCUMENTS 7,602,301 B1    10/2009   Stirling et al.
7,640,003 B1    12/2009   Pan
(Continued)

FOREIGN PATENT DOCUMENTS

WO    WO-2012109244 A1    8/2012

OTHER PUBLICATIONS

International Search Report and Written Opinion—PCT/US2015/037184—ISA/EPO—Nov. 5, 2015.
(Continued)

*Primary Examiner* — Kashif Siddiqui
*Assistant Examiner* — Minjung Kim
(74) *Attorney, Agent, or Firm* — Berkeley Law & Technology Group, LLP

(57) ABSTRACT

Example techniques are provided that may be implemented, at least in part, at a mobile device to determine certain parameters corresponding to movement of an object that is co-located with the mobile device and at least one other mobile device. In an example implementation, a mobile device may obtain measurements corresponding to sensors of a plurality of mobile devices co-located on an object, and determine at least one of an estimated speed of the object, an estimated heading of the object, or an estimated heading rate of the object based, at least in part, on all or a selected subset of the sensor measurements which are accepted for use.

44 Claims, 5 Drawing Sheets

(51) Int. Cl.
 *G01C 21/16* (2006.01)
 *H04W 52/02* (2009.01)
(52) U.S. Cl.
 CPC ....... *H04M 1/72572* (2013.01); *H04W 4/025* (2013.01); *H04W 4/026* (2013.01); *H04W 4/027* (2013.01); *H04W 4/028* (2013.01); *H04W 52/0212* (2013.01)

(56) References Cited

U.S. PATENT DOCUMENTS

| | | | |
|---|---|---|---|
| 2007/0231778 A1* | 10/2007 | Kim | A63B 69/00 434/250 |
| 2011/0246123 A1 | 10/2011 | Dellostritto et al. | |
| 2011/0313697 A1 | 12/2011 | Staton et al. | |
| 2012/0072168 A1 | 3/2012 | Yin et al. | |
| 2012/0130511 A1 | 5/2012 | Null et al. | |
| 2012/0158296 A1 | 6/2012 | Waters et al. | |
| 2012/0191405 A1 | 7/2012 | Molyneux et al. | |
| 2012/0259572 A1 | 10/2012 | Afzal et al. | |
| 2012/0268592 A1 | 10/2012 | Aragones et al. | |
| 2013/0217978 A1 | 8/2013 | Ma | |
| 2013/0324890 A1 | 12/2013 | Youssef et al. | |
| 2013/0335273 A1 | 12/2013 | Pakzad et al. | |
| 2014/0120838 A1 | 5/2014 | Lokshin | |
| 2015/0237479 A1 | 8/2015 | Fung et al. | |
| 2016/0007158 A1 | 1/2016 | Venkatraman et al. | |

OTHER PUBLICATIONS

Partial International Search Report—PCT/US2015/037184—ISA/EPO—Aug. 20, 2015.

* cited by examiner

TECHNIQUES FOR DETERMINING MOVEMENTS BASED ON SENSOR MEASUREMENTS FROM A PLURALITY OF MOBILE DEVICES CO-LOCATED WITH A PERSON

CLAIM OF PRIORITY

This application is a continuation of and claims priority under 35 USC 120 to U.S. patent application Ser. No. 14/323,984, filed Jul. 3, 2014, entitled "TECHNIQUES FOR DETERMINING MOVEMENTS BASED ON SENSOR MEASUREMENTS FROM A PLURALITY OF MOBILE DEVICES CO-LOCATED WITH A PERSON," which is assigned to the assignee hereof and which is incorporated herein by reference.

BACKGROUND

1. Field

The subject matter disclosed herein relates to electronic devices, and more particularly to methods, apparatuses and articles of manufacture for use by and/or in a mobile device to determine certain parameters corresponding to the movement of an object comprising a person co-located with the mobile device and at least one other mobile device.

2. Information

As its name implies, a mobile device may be moved about, e.g. typically being carried by or otherwise co-located in some manner with an object, such as, e.g., a person, an animal, a machine, etc. By way of some non-limiting examples, a mobile device may take the form of a cellular telephone, a smart phone, a tablet computer, a laptop computer, a wearable computer, a navigation and/or tracking device, etc.

Certain mobile devices may be enabled to receive location based services through the use of location determination technology including satellite positioning systems (SPS'), indoor location determination technologies and/or the like. In particular implementations, a mobile device may be provided with positioning assistance data to enable the mobile device to estimate its location using one or more positioning techniques or technologies. Thus, a mobile device that may be co-located with an object may be able to indicate a reasonable position and/or other like information regarding the movement or positioning of the object. However, in certain instances, such signal-based location services may be unavailable.

Accordingly, in certain instances it may be useful for a mobile device co-located with an object to make use of inertial sensor based positioning and movement techniques, such as, e.g., dead reckoning techniques and the like based on inertial sensors provided in the mobile device. Unfortunately, in certain instances, measurements from inertial sensors may not necessarily accurately reflect the movements of the object as a whole.

SUMMARY

In accordance with certain example implementations, a method may be provided which comprises, at a mobile device: obtaining one or more electrical signals representing first measurements corresponding to at least a first sensor of the mobile device, the first sensor comprising a first accelerometer or a first gyroscope, the mobile device being identified as initially co-located with a first point of an object comprising a person; transmitting a request to a wearable electronic device for second measurements; receiving one or more wireless signals from the wearable electronic device representing second measurements corresponding to at least a second sensor, wherein the second sensor is located in the wearable electronic device, and wherein the second sensor comprises a second accelerometer or a second gyroscope, the wearable electronic device being identified as initially co-located with a second point of the object and being physically separated from the mobile device; and determining at least one of an estimated speed of the object, an estimated heading of the object, or an estimated heading rate of the object based, at least in part, on an inference of a pedestrian movement of the person based, at least in part, on: (i) a first periodicity of sensed movement or a first phase of sensed movement from the first measurements; (ii) a second periodicity of sensed movement or second phase of sensed movement from the second measurements; or a combination of (i) and (ii).

In accordance with certain other example implementations, an apparatus may be provided for a mobile device which comprises: means for obtaining one or more electrical signals representing first measurements corresponding to at least a first sensor of the mobile device, the first sensor comprising a first accelerometer or a first gyroscope, the mobile device being identified as initially co-located with a first point of an object comprising a person; means for transmitting a request to a wearable electronic device for second measurements; means for receiving one or more wireless signals from the wearable electronic device representing second measurements corresponding to at least a second sensor, wherein the second sensor is located in the wearable electronic device, and wherein the second sensor comprises a second accelerometer or a second gyroscope, the wearable electronic device being identified as initially co-located with a second point of the object and being physically separated from the mobile device; and means for determining at least one of an estimated speed of the object, an estimated heading of the object, or an estimated heading rate of the object based, at least in part, on an inference of a pedestrian movement of the person based, at least in part, on: (i) a first periodicity of sensed movement or a first phase of sensed movement from the first measurements; (ii) a second periodicity of sensed movement or second phase of sensed movement from the second measurements; or a combination of (i) and (ii).

In accordance with still other example implementations, a mobile device may be provided which comprises: a first sensor comprising a first accelerometer or a first gyroscope; a transmitter; a receiver; and a processing unit to: obtain one or more electrical signals representing first measurements corresponding to at least a first sensor of the mobile device, the mobile device being identified as initially co-located with a first point of an object comprising a person; initiate transmission, via said transmitter, a request to a wearable electronic device for second measurements; receive, via the receiver, one or more wireless signals from the wearable electronic device representing second measurements corresponding to at least a second sensor, wherein the second sensor is located in the wearable electronic device, and wherein the second sensor comprises a second accelerometer or a second gyroscope, the wearable electronic device being identified as initially co-located with a second point of the object and being physically separated from the mobile device; and determine at least one of an estimated speed of the object, an estimated heading of the object, or an estimated heading rate of the object based, at least in part, on an inference of a pedestrian movement of the person based, at least in part, on: (i) a first periodicity of sensed movement or a first phase of sensed movement from the first measurements; (ii) a second periodicity of sensed movement or second phase of sensed movement from the second measurements; or a combination of (i) and (ii).

In accordance with yet other example implementations, an article of manufacture may be provided which comprises a non-transitory computer readable medium having stored therein computer implementable instructions executable by a processing unit of a mobile device, comprising: code to obtain one or more electrical signals representing first measurements corresponding to at least a first sensor of the mobile device, the first sensor comprising a first accelerometer or a first gyroscope, the mobile device being identified as initially co-located with a first point of an object comprising a person; code to initiate transmission of a request to a wearable electronic device for second measurements; code to obtain one or more wireless signals from the wearable electronic device representing second measurements corresponding to at least a second sensor, wherein the second sensor is located in the wearable electronic device, and wherein the second sensor comprises a second accelerometer or a second gyroscope, the wearable electronic device being identified as initially co-located with a second point of the object and being physically separated from the mobile device; and from a wearable electronic device determine at least one of an estimated speed of the object, an estimated heading of the object, or an estimated heading rate of the object based, at least in part, on an inference of a pedestrian movement of the person based, at least in part, on: (i) a first periodicity of sensed movement or a first phase of sensed movement from the first measurements; (ii) a second periodicity of sensed movement or second phase of sensed movement from the second measurements; or a combination of (i) and (ii).

In accordance with yet other example implementations, a method at a mobile device may comprise: obtaining a first indication of battery life, wherein the first indication of battery life is from a first battery, wherein the first battery is located in said mobile device; obtaining a second indication of battery life, wherein the second indication of battery life is from a second battery, and wherein the second battery is located in a wearable electronic device that is detached from said mobile device; and requesting either first measurements from a first sensor, said first sensor being located in said mobile device, or second measurements from a second sensor, said second sensor being located in said wearable electronic device, based, at least in part, on said first indication of battery life and said second indication of battery life.

In accordance with yet other example implementations, a mobile device may comprise: a first sensor: a first battery; a wireless receiver; and a processing unit to: obtain a first indication of battery life of said first battery; obtain, via said wireless receiver, a second indication of battery life, wherein the second indication of battery life is from a second battery, and wherein the second battery is located in a wearable electronic device that is detached from said mobile device; and request either first measurements from said first sensor or second measurements from a second sensor, said second sensor being located in said wearable electronic device, based, at least in part, on said first indication of battery life and said second indication of battery life.

In accordance with yet other example implementations, an article may comprise a non-transitory computer readable medium having stored therein computer implementable instructions executable by a processing unit of a mobile device, comprising: code to obtain a first indication of battery life, wherein the first indication of battery life is from a first battery, wherein the first battery is located in said mobile device; code to obtain a second indication of battery life, wherein the second indication of battery life is from a second battery, and wherein the second battery is located in a wearable electronic device that is detached from said mobile device; and code to request either first measurements from a first sensor, said first sensor being located in said mobile device, or second measurements from a second sensor, said second sensor being located in said wearable electronic device, based, at least in part, on said first indication of battery life and said second indication of battery life.

In accordance with yet other example implementations, an apparatus for use in a mobile device may comprise: means for obtaining a first indication of battery life, wherein the first indication of battery life is from a first battery, wherein the first battery is located in said mobile device; means for obtaining a second indication of battery life, wherein the second indication of battery life is from a second battery, and wherein the second battery is located in a wearable electronic device that is detached from said mobile device; and requesting either first measurements from a first sensor, said first sensor being located in said mobile device, or second measurements from a second sensor, said second sensor being located in said wearable electronic device, based, at least in part, on said first indication of battery life and said second indication of battery life.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
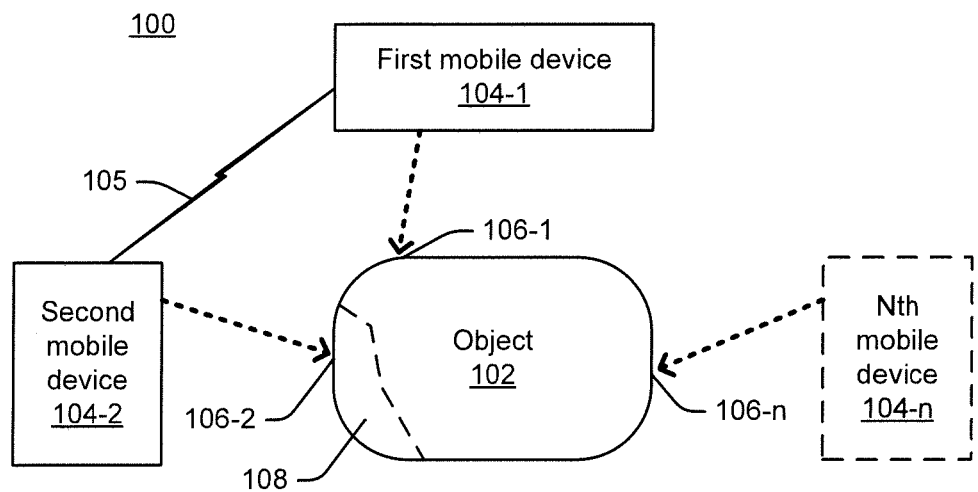
FIG. 1 is a schematic block diagram illustrating an example arrangement of representative electronic devices including an example mobile device that may determine certain parameters corresponding to the movement of an object co-located with the mobile device and at least one other mobile device, in accordance with certain example implementations.

Various example techniques are provided herein which may be implemented at a mobile device to determine certain parameters corresponding to the movement of an object co-located with the mobile device and at least one other mobile device, such as, for example, a wearable electronic device.

As pointed out in greater detail herein, various types of mobile devices (smartphones being one example) may comprise one or more motion sensors, such as, e.g., one or more accelerometers, that detect movements of the mobile device. These movements may suggest or otherwise support an inference of a particular activity state of a person co-located with the mobile device. For example, in certain instances an activity state of a person (or possibly some other object) co-located with a mobile device may correspond to the person's motion state, a position of the mobile device (e.g., with respect to the person), or both. For instance, a set of measurements obtained from an accelerometer over a period of time may be used, at least in part, to determine (e.g., through inference) whether the person may be walking, running, or stationary, e.g., by simply applying a threshold for an average magnitude of acceleration, or via some other known technique. In certain instances, for example, an average magnitude of acceleration and/or the like may be used, at least in part, to aid in determining whether a mobile device may be more likely co-located in the person's hand while walking, or somewhere else, e.g., in their pocket.

By examining various sensor-based motion measurements, a wider range of motion states and mobile device positions (e.g., with respect to a co-located object) may be determined, possibly with greater accuracy. For example, measurements corresponding to all or part of a mobile device's orientation (e.g., pitch, yaw, and roll from a gyroscope) may be considered to possibly improve the performance of a motion state classifier or other like capability. In certain instances, for example, a motion state of a person co-located with a mobile device may be classified based, at least in part, on a periodicity of sensed movement indicated by measurements from sensors of the mobile device. For example, a periodicity of sensed movement may be indicative of a pedestrian movement of a person (e.g., walking, running or performing some other like activity). In certain instances, such sensed movements may allow for a step count and/or the like to be determined (e.g., applying known pedometer techniques), which in turn may be used to estimate a speed of the person using known techniques, e.g., based on an estimated stride distance of the person's steps while walking, running, etc.

In certain instances, measurements (e.g., represented by one or more electrical signals) generated by one or more sensors may also support certain types of positioning and/or navigation using, e.g., dead reckoning and/or other known techniques. By way of an example, in certain instances measurements obtained from one or more accelerometers and one or more gyroscopes may be used to determine a heading and/or heading rate (heading rate of change), which may be used to determine a navigation trajectory, e.g., based on sensed movements from previously estimated or known positions within an environment.

As may be appreciated, in certain instances a person holding or carrying a mobile device such as a smartphone may also wear or carry another mobile device, such as, for example, a wearable computing device, for example, such as a smart watch, smart goggles/glasses, smart headwear/helmet/hat, smart footwear/shoes/anklet, and/or the like, which may be attachable to clothing and/or worn next to the person's body, etc., so as to be co-located with a particular point of the person. For example, a person may wear a smart watch on his/her wrist, in addition to carrying a smartphone in his/her pocket or purse. Similarly, a person may wear a smart anklet (ankle mounted device) on the ankle, smart shoe on the foot or smart hat or googles on the head, etc., in addition to carrying a smartphone. A wearable computing device may at times be in a better position to measure or detect particular activities than a smartphone being carried in a purse or pocket, for example. For example, a smart anklet or smart shoe may be better able to measure a number, spread/size and intensity of footsteps, and therefore may more effectively enable differentiating between or among running, walking slowly and walking fast. A smart anklet or smart shoe may also enable a measurement of gait. Also, a smart watch may enable better measurement of footsteps/gait, step intensity (e.g., by the arm swing intensity), step size, etc. while the arm is swinging as compared with a mobile device such as a smartphone located in a pocket or handbag. In particular implementations, a sensing device coupled to an appendage (e.g., arm, foot or leg) may provide measurements better suited to estimating location, orientation and movement of the appendage, and therefore, possibly better suited to determining overall speed and heading of a person (e.g., a pedestrian or jogger), than sensor measurements generated by a mobile device that is in a pocket, handbag, or other more central location on the body. In particular applications, it may be useful to know that an individual's head is looking away from the individual's hand, and that the individual's hand is co-located and moving in tandem with a hand-held mobile device to, for example, adjust volume or control illumination of a display. Similarly, in particular applications it may be useful to characterize hand motion relative to foot motion (and/or overall body/torso motion) to thereby characterize a user's current activity (e.g., walking, running, sitting, standing, etc.), and to infer a current mode of transportation such as an elevator, escalator, travelator or other mode of transit. In other particular applications, a combination of device movements may also be useful to infer other types of movement like fidgeting, dancing, exercise (of various sorts), game response, etc. As discussed herein, measurements obtained from sensors on wearable device(s) and sensors on another mobile device (e.g., smartphone) may be synergistically combined to enhance capabilities for characterizing activity. Also, sensors on different devices (e.g., sensors of a smartphone and wearable devices) may enable selection and deselection of individual sensors based on particular individual sensors (or combinations of sensors) providing the best response, eliminating duplicate readings and enabling efficient power management.

A wearable electronic device may comprise one or more sensors, such as accelerometer(s), gyroscope(s), magnetometer(s) that may be capable of generating various types of measurements, all or some of which may be used in classifying motion and/or navigation, e.g., as discussed in the examples above. A wearable electronic device may also comprise one or more battery sensors capable of generating an indication of remaining battery life, for example. In this context, an indication of battery life may comprise any signal, numerical representation, symbol or observable phenomenon that is reflective of indicative of a remaining battery life power and/or remaining operating time, and claimed subject matter is not limited in this respect. Wearable devices may also include cameras, useful for characterizing motion and/or context. For example, in a head mounted unit, a forward facing camera may assist in inferring a particular activity that a person is engaged in. In a particular implementation, a wireless communication link (e.g., Bluetooth, near field communication (NFC) link, and/ or the like) may be established between the mobile device (e.g., a hand held communication/computing device) and the wearable electronic device (e.g., a wearable computing device). This wireless communication link may allow for a combination or merging of measurements obtained at sensors of one mobile device with measurements obtained at sensors of one or more other devices (e.g., wearable devices).

In one example implementation, measurements obtained at one or more sensors of a mobile device and one or more sensors of a wearable electronic device may be combined, compared, either to each other or to motion profiles, to determine or confirm a particular motion classification. In particular, measurements obtained from one or more sensors of a mobile device may be compared with measurements obtained from one or more sensors of a wearable device to infer an individual's activity. Also, measurements obtained from one or more sensors of a device may be compared to a profile to infer an individual's activity. For example, in an embodiment, if both a mobile device and a wearable electronic device are both inferring a walking gait, measurements from sensors of both the mobile device and the wearable electronic device may be combined to better determine a timing of the steps, the size of the steps, the force of the steps and the direction of the steps to further infer, for example, if the person is walking or running, step size, and direction of steps. Similarly, signals from sensors on different devices may be combined for application to other motion profiles, and for use with a variety of different wearable electronic devices.

In an embodiment, if both a mobile device and a wearable electronic device (e.g., based on measurements obtained from sensors on those devices) are inferring a walking gait, and sensor measurements from both devices are sufficient to infer a particular activity from a motion profile (such as a walking motion profile), the mobile device may select measurements from sensors of one of the devices (and perhaps turn off a sensor in the other device to conserve battery life) and/or mix measurements from sensors on multiple devices. In a particular implementation, a particular motion profile indicative of a particular activity may be defined or characterized at least in part by different types of measurements and/or measurements from different sources (e.g., sensors on devices connected to different parts of a human body). Here, for example, the mobile device may combine or select sensor measurements as needed for comparison to a motion profile and/or infer a motion state such as direction/heading and velocity. In an embodiment, particular sensor measurements may be selected from a mobile device and/or various wearable electronic devices while ignoring or excluding other sensor measurements from the mobile device and/or various wearable electronic devices.

For example, in a particular embodiment a person with a mobile device may also wear two or more wearable electronic devices such as, for example, a wrist mounted wearable electronic device (such as a watch), a leg mounted wearable device such as an ankle bracelet (anklet) or a foot mounted wearable device such as a smart shoe. A leg or foot mounted wearable electronic device may be utilized to provide the most reliable motion characteristics related to walking or running (such as heading, gait timing, force of step, step distance, etc.) while the wrist mounted wearable electronic device may be used to characterize gestures, hand motions and upper body actions and/or to differentiate running from walking based on attitude of the device. Measurements from sensors on the mobile device may be used to confirm and/or modify a confidence in particular inferences of motion obtained by the wearable electronic device(s). Measurements from sensors on the mobile device may also be used to infer different actions or motions such as inferring that a phone display is being viewed, a phone speaker is placed against an ear versus, and a phone is placed on a table or mounted on a car. In an embodiment, measurements from sensors on the mobile device may be used primarily to infer a motion or action state while sensors on the wearable electronic device(s), on the other hand may be used to confirm the inference of motion or action state. Alternatively, sensors on a wearable electronic device may be used to quantify attributes of an action state such as, for example, stride length, step size, stride frequency, speed or periodicity of arm swinging, just to provide a few examples. In an embodiment, measurements from sensors on a mobile device may be used primarily to infer a motion or action state while the sensors on the wearable electronic device(s) may be used to quantify or characterize attributes of the inferred motion or action state.

In an embodiment, a mobile device may query one or more wearable electronic devices for an indication of battery life (e.g., how much battery life remains and/or how much longer the battery is expected to last and/or remaining voltage level or other measure of remaining power). Such an indication of battery life may also be considered in determining which sensors to be used or not used. For example, if a particular wearable electronic device is low on power, sensors on that wearable electronic device may be instructed to shut down and/or sensors on that wearable electronic device may not be accessed/utilized by the mobile device. Similarly, if the mobile device is low on power, it may utilize measurements from sensors on the wearable electronic device(s) and/or inferences based on measurements from the sensors on the wearable electronic device(s) instead of measurements from sensors on the mobile device itself, thereby conserving battery usage on the mobile device.

In one particular implementation, a mobile device may obtain a first indication of battery life which is indicative of a remaining battery life of a first battery, wherein the first battery is located in the mobile device the mobile device. The first battery may provide power to various subsystems of a mobile device including, for example, an RF transceiver, application processor and inertial/navigation sensors on the mobile device as indicated above. The mobile device may also obtain a second indication of remaining battery life of a second battery, wherein the second battery is located in a wearable electronic device that is detached from the mobile device. The second battery may provide power to various subsystems of the wearable electronic device such as, for example, inertial/navigation sensors or wireless transceivers, just to provide a couple of examples.

The mobile device may further request either first measurements from a first sensor first sensor located in mobile device (and powered by the first battery), or second measurements from a second sensor located in the wearable electronic device (and powered by the second battery) based, at least in part, on the first indication of battery life and the second indication of battery life. In one particular example implementation, the mobile device may request first measurements from the first sensor and not second measurements from the second sensor if the first and second indications of battery life suggest that the first battery has significantly more battery life than the second battery. Likewise, the mobile device may request second measurements from the second sensor and not first measurements from the first sensor if the first and second indications of battery life suggest that the second battery has significantly more battery life than the first battery. In another particular implementation, the mobile device may transmit one or more instructions to the wearable electronic device to turn off the second sensor, based, at least in part, on said second indication of battery life (e.g., so that any remaining battery life is preserved for more vital subsystems). In another particular implementation, the mobile device may further determine that the second indication of battery life is sufficient, based at least in part on the second indication of battery life exceeding a battery life threshold. In another particular implementation, requesting either the first measurements or the second measurements may further comprise requesting either the first measurements or the second measurements based, at least in part, on said first indication of remaining operating time and said second indication of remaining operating time.

In an embodiment, electrical signals generated by an inertial sensor (e.g., gyroscope or accelerometer) may exhibit a particular measurable periodicity or phase. The same or relatively same periodicity or phase generated by a signal from a sensor on the mobile device as by a signal from a sensor on the wearable electronic device may, for example, indicate a particular pedestrian movement. If a person may be undergoing some transient motion with regard to one of the mobile devices (e.g., looking at the wearable electronic device (e.g., a smart watch), or rotating the mobile device (e.g., a smartphone) to see a screen), there may be an effect on the measurements obtained from the mobile device undergoing transient motion, in which case it may be useful to rely on measurements from the other (possibly less affected) mobile device. In an embodiment, the measurements from sensors of a mobile device and sensors of one or more wearable electronic devices may be compared to determine which measurements are more reliable and which measurements are extraneous to a given motion model. For example, while attempting to infer direction/heading and velocity for a person that is waving their arms in the air, an inference technique may prioritize measurements obtained from sensors attached to a leg, foot or ankle (e.g., anklet or ankle bracelet or smart shoe sensor) over measurements obtained from watch/wrist mounted sensors and mobile device-based sensors. Similarly, in attempting to infer arm motions and/or actions such as differentiating between or among fidgeting, pointing, or pounding a hammer, an inference technique may prioritize measurements obtained from wrist, hand or arm mounted sensors over measurements obtained from sensors attached to a leg, foot or ankle. Accordingly, techniques are provided herein that may be implemented to select or deselect measurements from particular sensors based on a particular use or attempt to infer a particular activity.

As pointed out above, inertial sensor measurements may be processed to estimate a heading or heading rate for use in navigation. For example, measurements from accelerometers and/or gyroscopes may be used to estimate a heading rate (e.g., by detecting rotations). However, this may not be accurate or reliable under certain conditions, such as, e.g., rotations where the heading of a mobile device changes with respect to the object (person) or rotations where a gravity vector changes significantly. Using two or more different mobile devices, however, continuity and/or corroboration of a heading rate may be established. For example, heading rates calculated using measurements from a mobile device and a wearable electronic device may remain comparable, particularly while attempting to account other motion such as arm swings. Thus, for example, based on such comparisons it may be possible to determine whether one or more of such measurements may or may not be acceptable for a particular use. For example, in certain instances one or more threshold values may be used to determine if a measurement(s) is acceptable for use. Measurements from two or more sensors may be compared to determine the best value or values from two or more sensors may be combined to determine the best value. Additionally, such determinations may also consider previously obtained measurements and/or may use Kalman or other predictive filters to predict future motion and states. In another example, if a gravity vector determined based on measurements from one of the mobile devices changes (e.g., possibly suggesting that a heading rate calculated therefrom may not reliable/accurate), a heading rate determined based on measurements from the other device may still be deemed acceptable for use. As such, continuity in computation of a navigation trajectory and/or other like information, may be enhanced by intelligently determining which measurements may be acceptable for use (either alone or combined with other like measurements) and which measurements may not be acceptable for use. In an embodiment, the various measurements may also be weighted and combined, the weighting being based upon various factors such as agreement prior states such as motion states, headings, and/or velocity and/or the agreement with the various sensor measurements with a motion model or models.

While various example types of mobile devices are illustrated herein by way of example, it should be kept in mind that the techniques provided herein may be applied to a wide variety of mobile devices that may be co-located with an object. Moreover, claimed subject matter is not intended to necessarily be limited by any of these examples.

In certain example implementations, a mobile device may obtain first measurements corresponding to at least one sensor (e.g., a "first" sensor) at the mobile device. By way of example, a first sensor may comprise an inertial sensor, such as, e.g., an accelerometer, a gyroscope, and/or the like. The first measurements may, for example, be represented by one or more electrical signals. The first measurements may, for example, be indicative of raw measurement data generated by the first sensor, and/or processed measurement data resulting for the raw measurement data. For example, as is known in certain instances a sensor and/or other circuitry may be provided to process raw measurement data in some manner, e.g., to smooth out the data, filter the data, etc. In an embodiment, the first sensor may be comprised of multiple sensors, for example, where multiple accelerometers are used to detect x, y and z acceleration. In an embodiment, the first sensor may be a non-inertial sensor such as a magnetometer (to sense orientation of the device), a camera, an altimeter or other sensor.

The mobile device may receive second measurements corresponding to at least at least one sensor (e.g., a "second" sensor) of a wearable electronic device. By way of example, a second sensor may comprise an inertial sensor, such as, e.g., an accelerometer, a gyroscope, and/or the like. In an embodiment, the second sensor may be comprised of multiple sensors, for example, where multiple accelerometers are used to detect x, y and z acceleration. In an embodiment, the second sensor may be a non-inertial sensor such as a magnetometer (to sense orientation of the device), a camera, an altimeter or other sensor. The second measurements may, for example, be represented by one or more wireless signals transmitted by the wearable electronic device and received by the mobile device. The second measurements may, for example, be indicative of raw measurement data generated by the second sensor, and/or processed measurement data resulting for the raw measurement data.

As described in greater detail herein, in certain instances, the mobile device may be identified as being initially co-located with a first point of an object and the wearable electronic device, which is physically separate from the mobile device, may be identified as being initially co-located with a second point of the object. In an embodiment, co-located may refer to being physically adjacent, located on the same physical object or located on the same person. In an embodiment, co-location may be determined by short range wireless detection. Alternatively, a mobile device and a wearable electronic device(s) may be determined to be co-located by being paired by a user of those devices In another alternative, a mobile device and a wearable electronic device(s) may be determined to be co-located by being paired automatically based upon a device ID. In some particular embodiments, a wearable electronic device(s) may be determined to be co-located by authentication of the wearable electronic devices(s) as belonging to or being used by a particular user. In an embodiment, the pairing of the devices may be remotely configured, for example, on a computer or managed on a server.

As used herein, the term "object" is intended to generally comprise any physical object that may move about or otherwise be moved about within an environment, and which is sufficient in its size such that at least two mobile devices may be co-located at different points of the object (for example, on different points on a person such as in a pocket, on a wrist, and on an ankle). Such an object may, for example, have a physical shape that may change (e.g., may comprise movable parts) such that the relative position of different points of the object may change from time to time (for example, arms moving relative to legs and/or relative to a torso). By way of some examples, such an object may comprise a person, an animal, or a machine (e.g., having one or more movable parts).

Having obtained the first and second measurements, the mobile device may, for example, determine whether the first measurements and/or the second measurements may be accepted for use in one or more functions that may be provided, at least in part, by the mobile device. For example, the mobile device may provide or otherwise support, at least in part, one or more functions relating to positioning, navigation, and/or the like, e.g., for the object with respect to an environment within which the object may move or be moved. For example, accelerometer and gyro measurements from the mobile device and/or the wearable electronic device(s) and/or or measurements from a magnetometer and/or a camera may be used in dead reckoning or as an additional source of information while used in combination with wireless signal sources such as GNSS signals, WAN signals, WiFi signals, Bluetooth signals and/or other wireless signals for positioning and navigation. In certain instances first measurements and/or second measurements may be determined to be accepted for use based, at least in part, on one or more threshold values, e.g., which may be compared to the first measurements and/or the second measurements. In certain instances, as pointed out above, first measurements and/or second measurements may be determined to be used (or not) based upon indications of battery life. In certain instances, the first measurements and/or second measurements may be combined to improve reliability and/or accuracy of determinations relative to motion models, positioning, and/or navigation or as input into location-related filter processes such as Kalman Filters and Particle Filters.

By way of example, in certain instances, a threshold value may be based, at least in part, on an expected motion profile for the object. An expected motion profile for the object may, for example, be indicative of how the object may be expected to move or be moved within an environment. An expected motion profile for an object may indicate that certain movements of the object are within acceptable limits, or conversely within unacceptable limits. For example, an expected motion profile may indicate certain acceptable or unacceptable movements of the object with regard to one or more degrees of freedom, which may be sensed in some manner by the first measurements and/or second measurements. Thus, by way of example, an expected motion profile may indicate a range, a minimum limit, a maximum limit, etc., or an expected behavior that may be an acceptable (or unacceptable) for a rate of change in a movement of the object, e.g., with regard to one or more degrees of freedom. For example, an expected motion profile may indicate an acceptable range corresponding to how an object may be expected to transition within an environment with regard to a particular direction (e.g., movement up/down, left/right, forward/backward). For example, an expected motion profile may indicate an acceptable range corresponding to how an object may be expected to rotate within an environment (e.g., pitch, yaw, and roll).

For an object comprising movable parts, certain points of the object may at times be expected to experience movements that may be different from other points of the object. For example, assuming an object comprises a person, one or more points of the person's arm (e.g., near their wrist) may be expected to experience certain movements that may be different (e.g., different types, more pronounced, etc.) than might other point(s) of the person's torso (e.g., near their waist line). Also, measurements obtained from sensors originating from particular movable parts may be more indicative of particular types of motion or may be more determinative relative to location, heading, and heading rate, as previously discussed. Usefulness of measurements from a particular sensor or sensor location may also be situational depending, for example, on the motion state of the object. For example, different sensor combinations might be more useful while a person is running, versus jumping in place, versus fighting, versus gesturing, versus looking at the mobile device screen.

Accordingly, in certain example implementations, a threshold value or other selection factor may be based, at least in part, on one or more transient motion profiles for one or more points of an object. For example, a first transient motion profile may correspond to a first point of the object, and a second transient motion profile may correspond to a second point of the object.

A transient motion profile may, for example, be indicative of how one or more points of an object may be expected to move or be moved within acceptable limits, or conversely within unacceptable limits. For example, a transient motion profile may indicate certain acceptable or unacceptable movements of one or more points of an object with regard to one or more degrees of freedom, which may be sensed in some manner by the first measurements and/or second measurements. Thus, by way of example, a transient motion profile may indicate a range, a minimum limit, a maximum limit, etc., that may be an acceptable (or unacceptable) for a rate of change in a movement of one or more particular points of the object, e.g., with regard to one or more degrees of freedom. For example, a transient motion profile may indicate an acceptable range corresponding to how one or more particular points of an object may be expected to transition within an environment with regard to a particular direction (e.g., movement up/down, left/right, forward/backward). For example, a transient motion profile may indicate an acceptable range corresponding to how one or more particular points of an object may be expected to rotate within an environment (e.g., pitch, yaw, and roll).

In an example, a wrist mounted wearable electronic device, while a person is walking, may experience a limited range of motion, acceleration and orientation due, at least in part, to an outstretched, linear back and forth arm swing while walking. That particular range of motion may be used to define a walking transient motion profile. A wrist mounted wearable electronic device, while a person is running, on the other hand, may be subjected to a different range of motion, acceleration or orientation a particular human may run with arms bent and with shorter, quicker cycles, possibly at an angle, that, in an embodiment, may match a particular running or transient motion profile. In a different motion scenario, a wearable electronic device attached to an arm, wrist or other body location, may be subjected to motion that is incongruous with a particular transient motion profile. For example, a person may walk with arms extended while running or jogging with arms bent, changing an orientation of the accelerometer. If a person's arms are overhead and waiving or extended while carrying a box, for example, while other sensors (e.g., in a mobile device and/or attached to the ankle or leg) suggest that the person is walking, sensors in a wrist mounted wearable electronic device may be ignored, de-weighted or otherwise discounted for inferring velocity, heading or rate of heading. In an embodiment, sensors that disagree with a transient motion profile may also be used to determine subsidiary a transient motion profiles such as in inferring whether a person is walking while holding an object out front.

In certain example implementations, a mobile device may determine whether at least one of the first measurements or the second measurements is accepted for use based, at least in part, on a comparison of at least the first measurements and the second measurements. By way of example, a first measurement corresponding to a particular degree of freedom of movement sensed at a first point of an object may be compared to a second measurement corresponding to a particular degree of freedom of movement sensed at a second point of an object. In certain instances, if such first and second measurements match or are otherwise within a threshold range of one another, or if such first and second measurements correspond to expected motion for a particular mounting point consistent with a transient motion profile, then such first and second measurements may be more likely to be eventually determined to be accepted for use. Conversely, if such first and second measurements do not match or are otherwise not within a threshold range of one another, or if either of such first and second measurements are not within a threshold range of an expected range of motion associated with a transient motion profile, then one or both of such first and second measurements may be more likely to be eventually determined to not be accepted for use. In certain instances, additional comparisons may be applied to further determine whether one or more of such first and second measurements may be accepted for use or not accepted for use.

In certain example implementations, first and/or second measurements may be compared to one or more previous first and/or second measurements, if available, or compared to an expected range of motion associated with a transient motion profile, e.g., to determine whether such first and/or second measurements demonstrate (or lack) in consistency and/or appear to follow (or deviate) from an expected trend, pattern or profile. For example, if a first measurement or series of measurements appears sufficiently similar (e.g., based on some threshold value) to a previous first measurement or series of measurements that was determined to be accepted for use, or to an expected range of motion associated with a transient motion profile but the second measurement or series of measurements appears sufficiently dissimilar (e.g., based on some threshold value) to a previous second measurement or series of measurements that was determined to be accepted for use or to an expected range of motion associated with a transient motion profile, then the first measurement may eventually be determined to be accepted for use while the second measurement may eventually be determined to not be accepted for use.

With these examples in mind, in response to a determination that the first measurements and the second measurements are accepted for use, a mobile device may determine one or more characteristics corresponding to the object. For example, a mobile device may determine an estimated speed of an object and/or an estimated heading or heading rate of an object based, at least in part, on the first measurements and the second measurements that were determined to be accepted for use. In response to a determination that one but not both of the first measurements or the second measurements is accepted for use, a mobile device may determine an estimated speed of the object and/or an estimated heading or heading rate of the object based, at least in part, on the one of the first measurements or the second measurements that is accepted for use.

In certain example implementations, to determine an estimated speed of an object a mobile device may, for example, determine one or more of a first periodicity of sensed movement or a first phase of sensed movement from the first measurements, and one or more of a second periodicity of sensed movement or second phase of sensed movement from the second measurements. Such determinations may, for example, make use of one or more previous first or second measurements. Hence, a periodicity of sensed movement or phase of sensed movement may correspond to one or more periods of time that may be contiguous or discrete.

By way of an example, assuming that an object comprises a person, a first periodicity, a first phase, a second periodicity, and/or a second phase may be indicative of a pedestrian movement of the person, e.g., an estimated number of steps (e.g., walking or running) taken over a period of time, or a corresponding step rate. The acceleration and/or force associated with movement may also be indicative of stride length or determine whether a person is running or walking. Such pedestrian movement may be determined by applying various known pedometer techniques, e.g., based on sensed downward forces of a foot contacting the ground or a floor, a gravity vector, a sensed arm or leg swing, etc.). Such pedestrian movement may also be used to estimate a speed of the person, e.g., based on a stride distance, etc., using known techniques. As may be appreciated, SPS or other navigation technique(s) such as those using indoor wireless signals may be used in certain instances to determine, calibrate, or possibly otherwise affect a stride length. In an alternative, stride length, heading, heading changes and step count may be used to correct location determined through the use of wireless signals such as SPS, WiFi or WAN. For example, detecting a person turning may be utilized to detect that a person is entering a hall or office, and correct for uncertainty is a location determined with wireless signals. Similarly, changes in heading observed via a navigation technique(s) may be used in certain instances to possibly determine, calibrate, or possibly otherwise affect various other parameters, such as, for example, a heading rate bias.

In certain example implementations, a mobile device may determine at least one of a first gravity vector from the first measurements, or a second gravity vector from the second measurements. As such, in certain instances a mobile device may determine, at least in part, whether at least one of the first measurements or the second measurements may be accepted for use based on at least one of the first gravity vector, or the second gravity vector, which may be indicative of or otherwise relate to one or more degrees of freedom corresponding to all or part of an object. Similarly, in certain instances a mobile device may determine an estimated speed of the object and/or an estimated heading or heading rate of an object based, at least in part, on at least one of the first gravity vector or the second gravity vector. In certain instances a mobile device may select a transient motion profile, at least in part, based on at least one of the first gravity vector or the second gravity vector or, in some embodiments, a transient motion profile may be based upon a combination of the first gravity vector and the second gravity vector. For example, a combination of gravity vectors associated with footsteps combined with the gravity vectors associated with a downward extended, swinging arm may indicate a walking motion state while a combination of gravity vectors associated with footsteps combined with the gravity vectors associated with a horizontally extended, swinging arm may indicate a running motion state.

In certain example implementations, a mobile device may determine at least one of a mobile device orientation from the first measurements, or a wearable electronic device orientation from the second measurements. As such, in certain instances a mobile device may determine, at least in part, whether at least one of the first measurements or the second measurements is accepted for use based on the mobile device orientation, or the wearable electronic device orientation. By way of example, if a mobile device orientation appears to have changed or appears to be changing and such changes are determined to exceed a threshold value then the first measurements may eventually be determined to not be acceptable of for use. For example, if a mobile device comprises a smartphone that is for a first period of time is located within a person's jacket pocket wherein the mobile device's general orientation with regard to the object (here, the person) may be expected to remain fairly stable such that changes in the orientation of the mobile device during such first period of time may reasonably infer changes in the general orientation of at least a portion of the person (e.g., here, the person's torso). Thus, first measurements during such first period of time may eventually be determined to be accepted for use. However, continuing with this example, assuming that during a second period of time the person has removed the mobile device (here, a smartphone) from their jacket pocket and may be holding and moving about the smartphone in their hand, possibly out in front of their face (to provide for interactive use of the smartphone). Here, the mobile device orientation may be determined (e.g., via a threshold value) to possibly be changing too much and/or too often, and as such the first measurements during such second period of time may eventually be determined to not be accepted for use.

In certain instances a mobile device may determine an estimated speed of the object and/or an estimated heading or heading rate of the object based, at least in part, on the mobile device orientation, and/or the wearable electronic device orientation.

In certain example implementations, a mobile device may determine a navigation trajectory for an object based, at least in part, on an estimated speed of the object and/or an estimated heading or heading rate of the object.

Attention is drawn next to FIG. 1, which is a schematic diagram illustrating an environment 100 within which an object 102 may enter, leave, and/or otherwise move or be moved about, in accordance with an example implementation. As illustrated, a mobile device 104-1 may be provided and identified as being initially co-located with a first point 106-1 of object 102. Similarly, as shown, a second mobile device 104-2, such as, a wearable electronic device may be provided and identified as being initially co-located with a second point 106-2 of object 102. Second mobile device 104-2 may transmit one or more wireless signals to mobile device 104-1, as represented by wireless communication link 105. In certain instances, wireless communication link may represent a unidirectional communication capability, or a bidirectional communication capability.

Although many of the examples presented herein are based on techniques applied using mobile device 104-1 and second mobile device 104-2, it is not intended that the techniques or claimed subject matter necessarily be limited to just two mobile devices. Accordingly, as illustrated in FIG. 1, some techniques and claimed subject matter may obtain measurements for a plurality of sensors from a plurality of mobile devices (represented by Nth mobile device 104-*n*), which may be individually identified as being initially co-located with a particular point (represented by Nth point 106-*n*) of object 102. Although not shown, it should be understood that Nth mobile device 104-*n* may be capable of unidirectional or bidirectional wireless communication with one or more other mobile devices, such as, for example, mobile device 104-1. For example, in an embodiment, first mobile device 104-1 may represent a wireless phone, PDA, tablet, laptop or other computing device while second mobile device 104-2 through 104-*n* represent multiple wearable electronic devices (watches, ankle bracelets/anklets, hats, glasses, etc.). In another embodiment, there may be a mix of a wireless phones, PDAs, tablets, laptops, and/or other computing device and wearable electronic devices.

As further illustrated and represented by portion 108 of object 102, in certain instances object 102 comprise one or more parts or portions may move or be moved in some manner as to change object 102. Thus, in this example, it is assumed that portion 108 may move or be moved with respect to the remaining portion of object 102. For example, portion 108 may represent a leg of a person or an animal, or possible an arm or other like movable feature of a robot or machine. However, it should be understood that all or part of a motion of portion 108 may be constrained in some manner with respect to object 102. For example, a velocity of portion 108 may be constrained by or otherwise correspond generally to a velocity of object 102, since such velocities may tend to only differ by a certain amount, assuming that portion 108 does not extend too far outward from object 102. Also, some wearable electronic devices may, based upon their typical use, have an associated and/or constrained range of motion associated with different transient motion profile.

Figure 2:
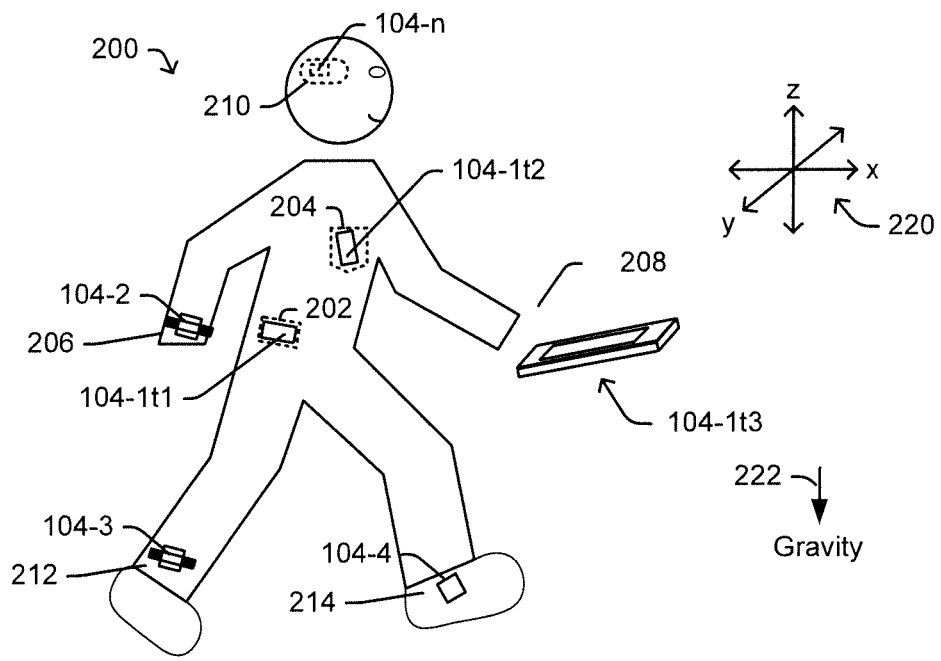
FIG. 2 is an illustrative diagram depicting an example arrangement of representative electronic devices including several example mobile devices and wearable electronic device with regard to an object comprising a person, in accordance with certain example implementations.

Attention is drawn next to FIG. 2, which is illustrative diagram showing a person 200 (e.g., an object) in relation to some example mobile devices. In this example, it is assumed that the person is ambulatory and engaged in a pedestrian movement (e.g., walking, running, standing, and/or the like or some combination thereof) from time to time. As shown, in certain instances and/or at certain times (e.g., time t1), person 200 may carry a mobile device (identified as 104-1t1) in a holder 202 (e.g., possibly a mechanism that may be connected to a belt, possibly a pocket in an item of clothing near the waistline, etc.). Here, for example, the mobile device may be identified as being co-located with the person's right hip, or the like. In another example, in certain instances and/or at certain times (e.g., time t2), person 200 may carry a mobile device (identified as 104-1t2) in a jacket pocket 204. Here, for example, the mobile device may be identified as being co-located with the person's torso. In a third example, in certain instances and/or at certain times (e.g., time t3), person 200 may grasp a mobile device (identified as 104-1t3) in their left hand and hold it out in front of his/her body (identified in the region of 208) to interact with the mobile device in some manner. Here, for example, the mobile device may have been initially identified as being co-located with the person's hip (e.g., as at time t1) or torso (e.g., as at time t2), however, as of time t3 the person has moved the mobile device. As may be appreciated, first measurements obtained from a first sensor (e.g., an accelerometer, a gyroscope, etc.) on the mobile device corresponding to movements corresponding to the new position at time t3 may be substantially different from similar measurements obtained while mobile device is more closely carried/held nearer the person's hip (time t1) and/or person's torso (time t2). In certain instances, such changes may eventually lead to all or some of the applicable first measurements to be determined to not be accepted for use.

As further illustrated in the simple drawing of FIG. 2, it should be understood that an orientation of the mobile device at times t1 or t2 may remain basically unchanged once stowed in a pocket or holder and hence may likely change in a manner that matches the person's (object's) general orientation. However, the orientation of the mobile device at or about time t3 (e.g., as the user grasps and retrieves the mobile device from a pocket or holder and moves it to a more useful position) is likely to change significantly in comparison to the person's (object's) general orientation. Hence, in certain instances, such changes may eventually lead to all or some of the applicable first measurements to be determined to not be accepted for use.

As is known, a coordinate system or other like reference mechanism may be used to identify one or more degrees of freedom corresponding to various movements, e.g., within a two or three dimensional region of space. Accordingly, by way of representation, an example three dimensional coordinate system 220 is illustrated as having intersecting x, y, and z planes. Also, illustrated in FIG. 2, is a representative gravity vector 222 that may correspond to example person 200 and/or example coordinate system 220. In certain instances, gravity vector 222 may be detected and/or measured based, at least in part, on one or more first or second measurements from one or more sensors.

FIG. 2 illustrates an example second mobile device 104-2 in the form of a wearable electronic device (here, e.g., a wristband, a wrist watch, etc.) which may be identified as being initially co-located near the wrist of the person's right arm as represented by point 206. As may be expected, the location of second mobile device 104-2 in this example may lead to significantly greater transient motions for the wearable electronic device as the person moves their right arm, when compared to mobile device 104-1t1 (at time t1 in a holder on the persons belt near their hip). Such movements may, at times, eventually lead to all or some of the applicable second measurements to be determined to not be accepted for use. However, in certain instances, even though the person may be moving their right arm (e.g., swinging their arms while walking or running) the all or part of the second measurements may nonetheless be determined to be accepted for use. For example, in certain instances a periodicity of a sensed movement and/or a phase of a sensed movement (e.g., corresponding to steps, swinging arms, etc.) may be determinable from the second measurements and hence some second measurements may be determined to be accepted for use. In another example, in certain instances, at least a portion of the second measurements may be of use in determining an orientation of the person (object) because there may be a determinable mathematical relationship between the general positioning/orientation of the wearable electronic device as it moves with the person's arm respective to a likely forward direction of movement, e.g., as the person moves forward swinging their arm the second measurements from wearable electronic device may indicate that such swinging movements occur generally within a certain plane that may be parallel or somehow otherwise related to the direction of travel of the person. Hence, for this or other like reasons, certain second measurements may be determined to be accepted for use. FIG. 2 also illustrates mobile device 104-3, an ankle-mounted mobile device on ankle 212, and a shoe or other footwear-based mobile device 104-4 on foot 214. Both foot and ankle-mounted devices are may provide, in some conditions, better indications of step count, duration, and length, as well as overall heading of the body by measuring the timing, intensity and direction of step impacts. As with the arm, when walking, the legs and feet typically swing within the plane of motion of travel or parallel thereto. Hence, for these and other reasons, leg, ankle and foot based sensors may sometimes be determined to be accepted for use, either in complement to other mobile device measurements, or, for reasons that may include, but are not limited to, power savings or movement characterization, determination and/or quantization, may sometimes be used instead of other measurements from other mobile devices. Also, in some embodiments, sensor measurements from particular parts of the body such as the wrist 206, ankle 212 and foot 214, may be preferable to sensor measurements from other areas, due to the proximity to the area of the body that is most directly in motion or due to the clarity and/or intensity of readings from that area of the body relative to a particular type of motion, such as may be represented by a motion profile, such as walking, running, swimming, etc.

FIG. 2 also illustrates an example Nth mobile device 104-n in the form of a wearable computing device (here, e.g., a headband, a hat, an earpiece, headphones, glasses, etc.) which may be identified as being initially co-located near a point on the person's head or face as represented by point 210. Note that the Nth mobile device may comprise a "wearable electronic device", e.g., as recited in claimed subject matter. As may be expected, the location of Nth mobile device 104-n in this example may lead to more transient motions, when compared to mobile device 104-1t1 (at time t1 in a holder on the persons belt near their hip). Such movements may, at times, eventually lead to all or some of the applicable second measurements to be determined to not be accepted for use. However, in certain instances, even though the person may be moving their head a bit more, all or part of the Nth measurements may nonetheless be determined to be accepted for use. For example, in certain instances a periodicity of a sensed movement and/or a phase of a sensed movement (e.g., corresponding to steps, etc.) may be determinable from the Nth measurements and hence some Nth measurements may be determined to be accepted for use. In another example, in certain instances, at least a portion of the Nth measurements may be of use in determining an orientation of the person (object) because it may be likely that, more often than not, a person may look in the direction in which they may be moving. Hence, for this or other like reasons, certain Nth measurements may be determined to be accepted for use.

It should be understood that the example positioning of mobile devices with regard to a person (object) as illustrated in FIG. 2, are not intended to necessarily limit claimed subject matter. Thus, for example, in certain instances a mobile device may be located nearer to a person's foot (not shown). In certain instances, a mobile device may be provided within or with an artificial appendage (not shown) used by the person. Indeed, in certain instances all or part of a mobile device may be implanted within a person's body (within the object).

Figure 3:
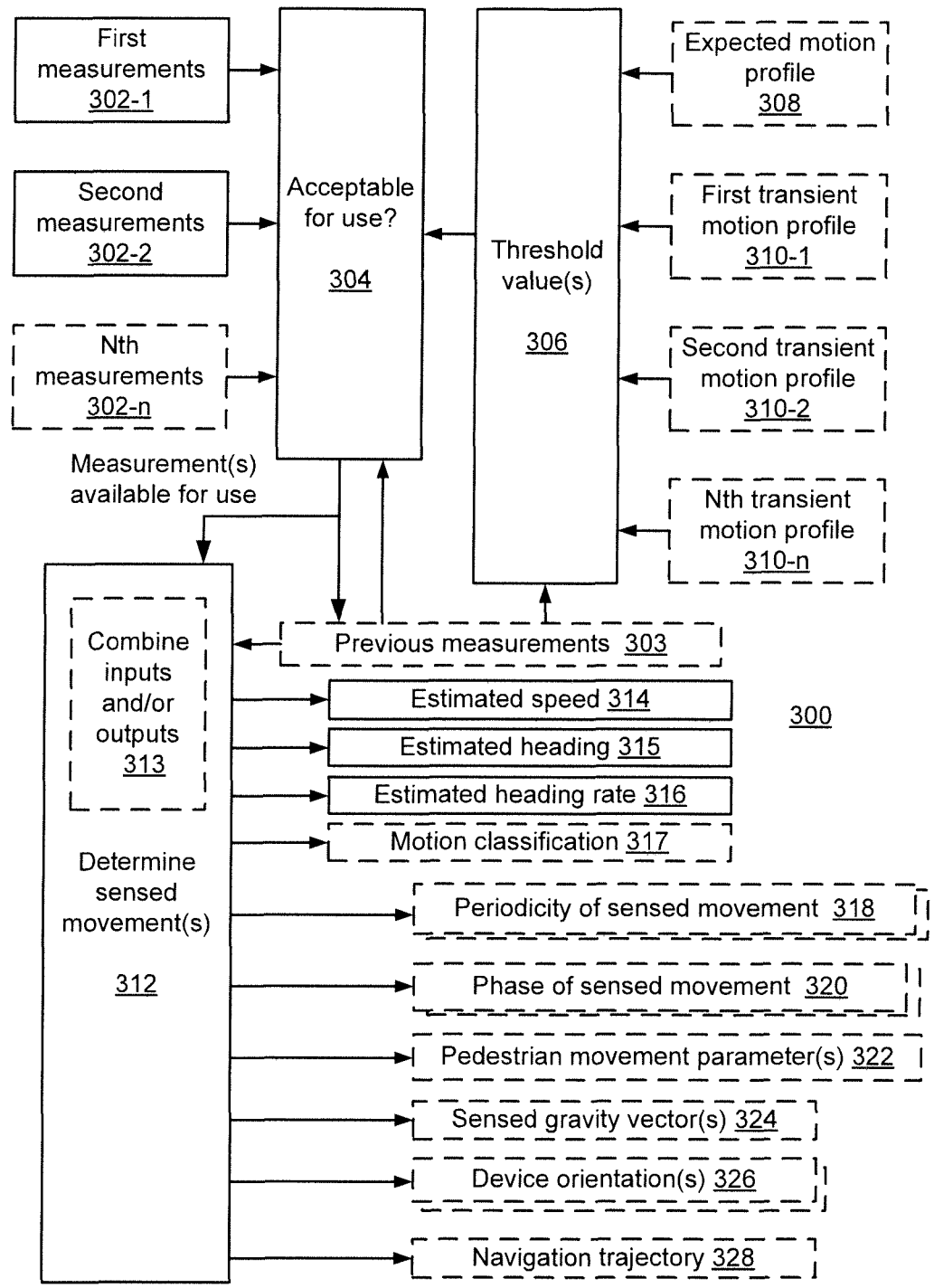
FIG. 3 is a schematic block diagram illustrating an apparatus that may be implemented in a mobile device, e.g., as in FIG. 1, to determine certain parameters corresponding to the movement of an object co-located with the mobile device and at least one other mobile device such as a wearable electronic device, in accordance with certain example implementations.

Attention is drawn next to FIG. 3, which is a schematic diagram illustrating an example apparatus 300 that may be implemented in whole or part in mobile device 104-1 (FIG. 1), in accordance with certain example implementations.

As shown, first measurements 302-1 and second measurements 302-2 may be obtained (received) and provided to decision block 304. In certain implementations, other measurements may be obtained (received) and provided to decision block 304, as represented by Nth measurements 302-n. Further one or more threshold values 306 and/or the like may be provided to decision block 304. As shown in the is example, in certain instances one or more threshold values 306 may be based, at least in part, on an expected motion profile 308 for the object. For example, an expected motion profile 308 for a person may indicate certain expected pedestrian motion characteristics and/or the like. In certain instances one or more threshold values 306 may be based, at least in part, on one or more transient motion profiles, e.g., corresponding to different points of an object. In certain instances one or more threshold values 306 may be based, at least in part, on one or more sensor inputs or outputs, for example, to determine whether a sensor may be available or appropriate for use. For example, a first transient motion profile 310-1 may correspond to a first point of an object, a second transient motion profile 310-2 may correspond to a second point of an object, and an Nth transient motion profile 310-n may correspond to an Nth point of an object. For example, such transient motion profiles for a person may indicate certain expected pedestrian motion characteristics for certain points, such as, e.g., at 202, 204, 206, 208, and 210 (see FIG. 2), just to name a few examples. Also, in certain instances, one or more indication(s) of battery life on a particular mobile device and/or a particular wearable electronic device may be used to determine whether a particular sensor may be available or appropriate for use.

As shown, in certain instances, if available one or more previous measurements 303 may be provided to decision block 304. In certain instances, one or more threshold values 306 and/or the like may be based, at least in part, on one or more previous measurements 303. In certain instances, one or more previous measurements 303 may correspond to one or more mobile devices and/or one or sensors and/or one or more points of an object, just to name a few examples. In certain instances, one or more previous measurements 303 may comprise measurements previously determined to be accepted for use. However, there may be other instances, wherein one or more previous measurements 303 may comprise measurements previously determined to not be accepted for use.

At decision block 304, a decision is made as to whether one or more measurements are accepted for use, e.g., at block 312. As mentioned, such a decision may, for example, be based, at least in part, on one or more threshold value(s) 306. As mentioned, such a decision may, for example, be based, at least in part, on a comparison of one or more measurements. At block 312, one or more sensed movements corresponding to all or part of an object may be determined based, at least in part, on one or more measurement determined to be accepted for use. By way of example, block 312 may determine, at least in part, an estimated speed 314 of an object, an estimated heading 315 of an object, and/or an estimated heading rate 316 of an object. In certain instances, a motion classification 317 may be determined. In certain instances, block 312 may determine, at least in part, one or more periodicities of sensed movements 318, one or more phases of sensed movement 320, all or part of one or more pedestrian movement parameters 322, one or more sensed gravity vectors 324, all or part of one or more mobile device orientations, all or part of a navigation trajectory 328, and/or the like or some combination thereof. In certain example implementations, a block 313 may be provided (shown here, by example, in block 312), may combine or otherwise make use of two or more inputs (and/or outputs) of block 312 in some manner. For example, two or more inputs to block 312 may be combined in certain instances to possibly improve detection of a speed (for example, via more accurate step detection), to possibly improve turn rate calculations, etc., just to name a few examples.

Figure 4:
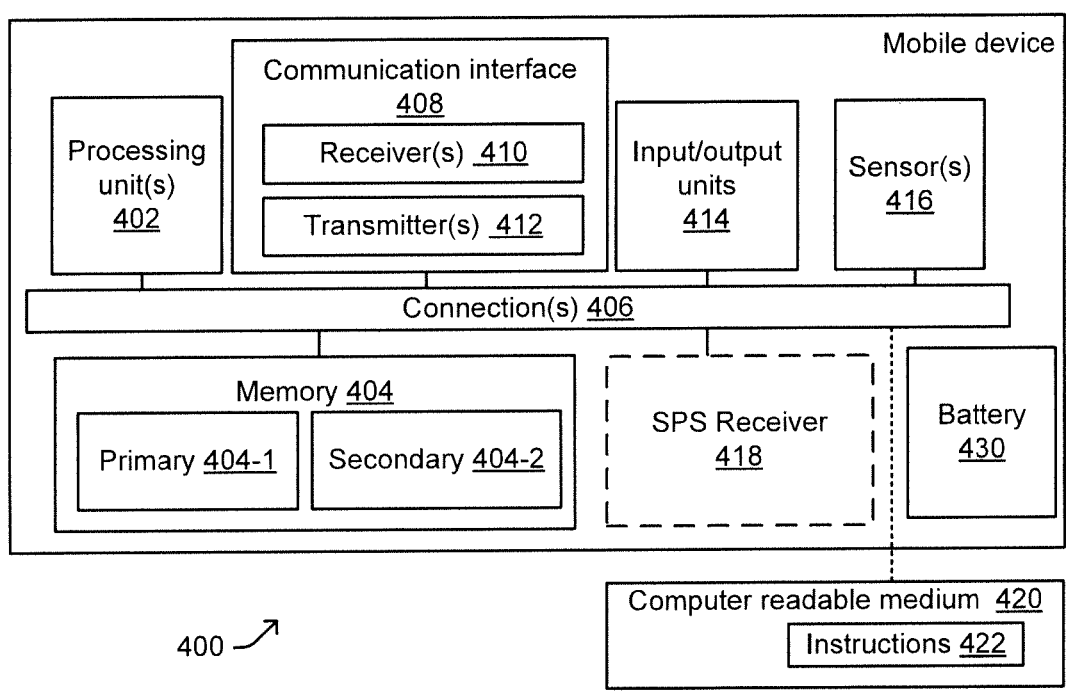
FIG. 4 is a schematic diagram illustrating certain features of an example computing platform that may be provisioned in whole or part within a mobile device, e.g., as in FIG. 1, in accordance with certain example implementations.

FIG. 4 is a schematic diagram illustrating certain features of an example mobile device 400. It should be understood that all or part of the features shown in mobile device 400 may be provided in mobile device 104-1, second mobile device 104-2, and/or Nth mobile device 104-n (FIG. 1), including in wearable electronic devices. It should also be understood that the example features shown in computing device 400 are not intended to show an exhaustive list of features that may be provided within a mobile device. Further still, it should be understood that in certain instances, one or more, or all, of the mobile devices may be of the same or of a different type, form, manufacture, make, model, etc.

As illustrated, mobile device 400 may comprise one or more processing units 402 (e.g., to perform data processing in accordance with certain techniques provided herein, including the processing of sensor data and of battery indication data) coupled to memory 404 via one or more connections 406 (e.g., one or more electrical conductors, one or more electrically conductive paths, one or more buses, one or more fiber-optic paths, one or more circuits, one or more buffers, one or more transmitters, one or more receivers, etc.). Processing unit(s) 402 may, for example, be implemented in hardware or a combination of hardware and software. Processing unit(s) 402 may be representative of one or more circuits configurable to perform at least a portion of a data computing procedure or process, including but not limited to the processing of sensor data and of battery indication data, for example, sensor data received from sensors 440 or from battery 430 respectively, both from the mobile device 400 or from remote mobile devices such as wearable electronic devices by way of the communications interface 408. By way of example but not limitation, a processing unit may include some form of a system-on-a-chip (SOC), one or more processors, controllers, microprocessors, micro-controllers, application specific integrated circuits, digital signal processors, programmable logic devices, field programmable gate arrays, or the like, or any combination thereof. Processing unit(s) 402 may include but are not limited to general application processors and dedicated sensor processor(s). Processing unit(s) 402 may receive and analyze sensor measurements and initiate transmission and reception of sensor request messages, sensor control messages and sensor measurements through communication interface 408 or through input/output units 414. Processing unit(s) 402 may initiate the activation, de-activation and/or solicitation of various sensors 416 on mobile device 104 including various computing and wearable electronic devices.

Memory 404 may be representative of any data storage mechanism. Memory 404 may include, for example, a primary memory 404-1 and/or a secondary memory 404-2. Primary memory 404-1 may comprise, for example, a random access memory, read only memory, etc. Memory 404 may store sensor measurements from sensor(s) 616, whether local or from a remote device (such as a wearable electronic device), and may be used to analyze the sensor measurements from sensor(s) 616. While illustrated in this example as being separate from the processing units, it should be understood that all or part of a primary memory may be provided within or otherwise co-located and coupled with processing unit 402 or other like circuitry within the mobile device. Secondary memory 404-2 may comprise, for example, the same or similar type of memory as primary memory and/or one or more data storage devices or systems, such as, for example, a solid motion state memory drive, etc. In certain implementations, secondary memory may be operatively receptive of, or otherwise configurable to couple to, a non-transitory computer readable medium 420. Memory 404 and/or non-transitory computer readable medium 420 may comprise instructions 422 for use in performing data processing, e.g., in accordance with the applicable techniques as provided herein. Battery 430 may include additional circuitry to manage and/or measure power and may be used to provide indications of battery life for the respective mobile device. In various embodiments, processing unit 402 may request/send sensor measurements and/or battery indication information via the communication interface 408 from/to other processing units 402' on other mobile devices (such as wearable devices) 104'.

Special purpose computing platform 400 may, for example, further comprise one or more communication interfaces 408. Communication interface 408 may, for example, comprise one or more wired and/or wireless network interface units, radios, modems, etc., represented here by one or more receivers 410 and one or more transmitters 412 (or comprise a transceiver acting as both receiver(s) 410 and transmitter(s) 412). Where a transmitter and receiver are both referred to herein, it is understood to also encompass, in some embodiments, an integrated transceiver. It should be understood that in certain implementations, communication interface 408 may comprise one or more transceivers, and/or the like. Further, it should be understood that although not shown, communication interface 408 may comprise one or more antennas and/or other circuitry as may be applicable given the communication interface capability.

In accordance with certain example implementations, communication interface 408 may, for example, be enabled for use with various wired communication networks, e.g., such as telephone system, a local area network, wired or wireless, an object or body-based network such as a network of Bluetooth or other short range transceivers connected to the body, a wide area network, a personal area network, an intranet, the Internet, etc.

In accordance with certain example implementations, communication interface 408 may, for example, be enabled for use with various wireless communication networks such as a wireless wide area network (WWAN), a wireless local area network (WLAN), a wireless personal area network (WPAN), an object or body-based network, (such as a local Bluetooth network), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMBP capability), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMAX, Ultra Mobile Broadband (UMB), and/or the like. Additionally, communication interface(s) 408 may further provide for infrared-based communications with one or more other devices. A WLAN may, for example, comprise an IEEE 802.11x network, and a WPAN may comprise a Bluetooth network, an IEEE 802.15x, for example. A WPAN may be used to interconnect multiple mobile devices on the same person or in the nearby environment, such as those utilized to communicate between various mobile devices on a person or object to send and receive sensor data, commands, battery indications and other mobile device information and/or commands. Wireless communication implementations described herein may also be used in connection with any combination of WWAN, WLAN or WPAN.

Representative mobile device 104 in FIG. 4 may, for example, further comprise one or more input and/or output units 414. Input and/or output units 414 may represent one or more devices or other like mechanisms that may be used to obtain inputs from and/or provide outputs to one or more other devices and/or a user. Thus, for example, input and/or output units 414 may comprise various buttons, switches, a touch pad, a trackball, a joystick, a touch screen, a keyboard, a microphone, a camera, an eye tracker, and/or the like, which may be used to receive one or more user inputs. In certain instances, input and/or output units 414 may comprise various devices that may be used in producing a visual output, an audible output, and/or a tactile output for a user. For example, input and/or output units 414 may be used to present a video display, graphical user interface, positioning and/or navigation related information, visual representations of electronic map, routing directions, etc., via a display mechanism and/or audio mechanism.

Representative mobile device 104 in FIG. 4 may, for example, comprise one or more sensors 416. For example, sensor(s) 416 may represent one or more environmental sensors, such as, e.g., a magnetometer or compass, a barometer or altimeter, etc., and which may be useful for positioning and/or determining a certain movements. For example, sensor(s) 416 may represent one or more inertial sensors, which may be useful in detecting certain movements. Thus for example, sensor(s) 416 may comprise one or more accelerometers, one or one or more gyroscopes. Further, in certain instances sensor(s) 416 may comprise and/or take the form of one or more input devices such as a sound transducer, a microphone, a camera, a light sensor, etc.

In certain instances, some mobile devices may comprise a satellite positioning system (SPS) receiver 418 for acquiring SPS signals 134 via one or more antennas (not shown). SPS receiver 418 may also process, in whole or in part, acquired SPS signals 134 for estimating a position and/or a motion of a mobile device. In certain instances, SPS receiver 418 may comprise one or more processing unit(s) (not shown), e.g., one or more general purpose processors, one or more digital signal processors DSP(s), one or more specialized processors that may also be utilized to process acquired SPS signals, in whole or in part, and/or calculate an estimated location of a mobile device. In certain implementations, all or part of such processing of acquired SPS signals may be performed by other processing capabilities in a mobile device, e.g., processing unit(s) 402, memory 404, etc., in conjunction with SPS receiver 418. Storage of SPS or other signals for use in performing positioning operations may be performed in memory 404 or registers (not shown).

In certain instances, sensor(s) 416 may generate analog or digital signals that may be stored in memory 404 and processed by DPS(s) (not shown) or processing unit(s) 402 in support of one or more applications such as, for example, applications directed to positioning or navigation operations based, at least in part, on one or more positioning functions.

Processing unit(s) 402 may comprise a dedicated/processor or the like that may be capable of performing baseband processing of signals acquired and down converted at receiver(s) 410 of communication interface 408 or SPS receiver 418. Similarly, a modem processor or the like may perform baseband processing of signals to be up converted for transmission by (wireless) transmitter(s) 412. In alternative implementations, instead of having a dedicated modem processor, baseband processing may be performed by a general purpose processor or DSP (e.g., general purpose and/or application processor). It should be understood, however, that these are merely examples of structures that may perform baseband processing, and that claimed subject matter is not limited in this respect. Moreover, it should be understood that the example techniques provided herein may be adapted for a variety of different electronic devices, mobile devices, transmitting devices, environments, position fix modes, etc.

As pointed out above, features shown and described with respect to mobile device 104 may characterize features in mobile device 104-1 (e.g., a handset that may be held in a user's hand or pocket) or mobile devices 104-2 through n (e.g., wearable electronic devices that are attached to a specific part of a user's body such as a wristwatch). In one particular example and as discussed elsewhere herein in connection with specific aspects of an implementation of a mobile device 104-1 (e.g., as a handset held in a user's hand or pocket), one or more applications residing or hosted on processing units 402 and memory 404 may use or process sensor measurements from sensors 416 or sensor measurements received in messages from a mobile device 104-2 through n at communication interface 408. Here, for example, processing unit(s) 402 may initiate transmission of polling or request messages to be transmitted to mobile devices 104-2 through n to request sensor measurements, received indications of battery life, just to provide a few examples.

As pointed out above, in one particular example and as discussed elsewhere herein in connection with specific aspects of an implementation of a mobile device 104-2 through n (e.g., as a wearable electronic device), processing unit(s) 402 may host applications to, for example, monitor remaining battery life of battery 430 and generate indications of battery life, obtain sensor measurements from sensor(s) 416 and/or compute inferences of activity based on the sensor measurements, just to provide a few examples. Processing unit(s) 402 may also initiate transmission of messages to another mobile device (e.g., a mobile device 104-1) in response to a request or polling message to provide, for example, indications of remaining battery life, sensor measurements obtained from sensor(s) 416.

Figure 5A:
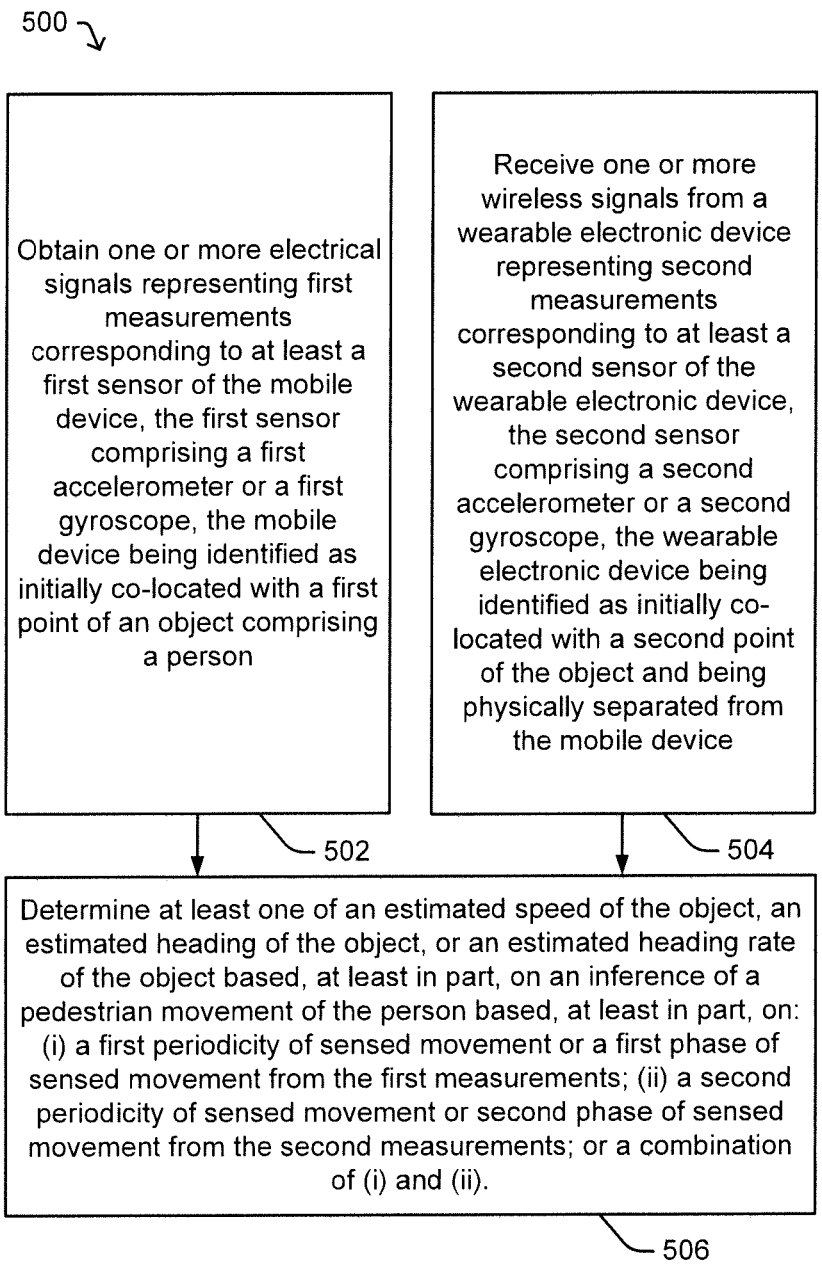
FIG. 5A and FIG. 5B are flow diagrams illustrating some example processes that may be implemented in a mobile device, e.g., as in FIG. 1, to determine certain parameters corresponding to the movement of an object co-located with the mobile device and at least one other mobile device, in accordance with certain example implementations.

Attention is drawn next to FIG. 5A, which is a flow diagram illustrating an example process 500 that may be implemented in whole or in part by example mobile device 104-1 (FIG. 1), example apparatus 300 (FIG. 3), example special purpose computing platform 400 (FIG. 4), and/or other like electronic devices/circuits, in accordance with certain example implementations.

At example block 502, one or more electrical signals representing first measurements corresponding to at least a first sensor of a mobile device may be obtained. As mentioned, in certain instances, one or more of the first measurements may correspond to raw sensor data, while in other instances one or more of the first measurements may have undergone certain processing. In certain instances, one or more first measurements may be obtained from the sensor, while in other instances one or more first measurements may be obtained from memory.

At example, block 504, one or more wireless signals representing second measurements corresponding to at least a second sensor of a wearable electronic device may be obtained (e.g., received via a receiver 410 (FIG. 4)). As mentioned, in certain instances, one or more of the second measurements may correspond to raw sensor data, while in other instances one or more of the second measurements may have undergone certain processing (e.g., possibly at the wearable electronic device, and/or at the mobile device). In certain instances, one or more second measurements may be obtained from the receiver or communication interface; while in other instances one or more first measurements may be obtained from memory.

At example block 506, at least one of an estimated speed of an object or an estimated heading or heading rate of the object may be determined. For example, at least one of an estimated speed of an object or an estimated heading or heading rate of the object may be determined based, at least in part, on at least one of the first measurements and at least one of the second measurements, in response to a determination that such first measurements and such second measurements are accepted for use. Likewise, if certain Nth measurements are also determined to be accepted for use, then in certain instances at least one of an estimated speed of an object or an estimated heading or heading rate of the object may be determined based, at least in part, on at least one of the first measurements, at least one of the second measurements, and at least one of the Nth measurements.

However, also at example block 506, in response to a determination that one but not both of the first measurements or the second measurements is accepted for use, at least one of an estimated speed of an object or an estimated heading or heading rate of the object may be determined based, at least in part, on the one of the first measurements or the second measurements that is accepted for use. Likewise, if certain Nth measurements are also determined to either accepted for use while others are not accepted for use, then in certain instances at least one of an estimated speed of an object or an estimated heading or heading rate of the object may be determined based, at least in part, on all or some subset of whichever measurements are excepted for use.

Figure 5B:
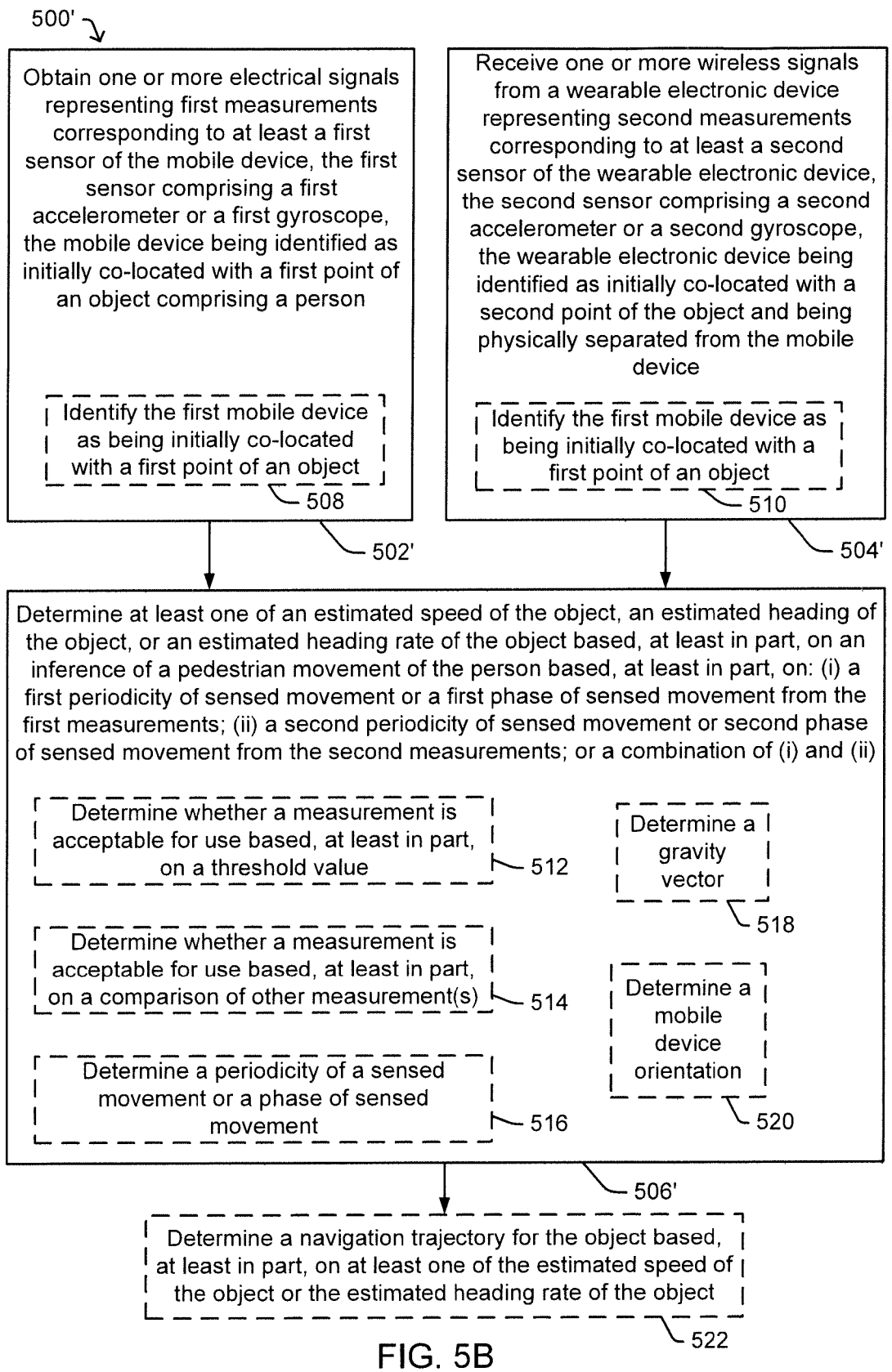

Attention is drawn next to FIG. 5B, which is a flow diagram illustrating an example process 500' that may be implemented in whole or in part by example mobile device 104-1 (FIG. 1), example apparatus 300 (FIG. 3), example special purpose computing platform 400 (FIG. 4), and/or other like electronic devices/circuits, in accordance with certain example implementations.

At example block 502', one or more electrical signals representing first measurements corresponding to at least a first sensor of a mobile device may be obtained. Here, in certain instances, as shown at example block 508, the mobile device may be identified as being initially co-located with a first point of an object. By way of example, mobile device may be identified as being initially co-located with a first point of an object based on various identifying data available from the mobile device or possibly one or more other devices (e.g., a network server, etc.). For example, if mobile device corresponds to a particular form of a wearable computing device an assumption or inference may be that the mobile device is being worn or otherwise being carried, attached, etc., as intended by the object. For example, a person may properly wear a hat, helmet, headphones, hearing aid, glasses, goggles, shoes, belt, necklace, ear ring, wristband, wrist watch, backpack, and/or the like; likewise, a collar, bit, saddle, tag, etc., may be properly mounted on an animal; and certain specific parts of a machine or attachments thereto may properly affixed or otherwise applied to a machine, just to name a few examples. In certain instances, over time it may be possible to identify that the mobile device may be more likely co-located at a different point (new first point) of an object. For example, one or more first measurements may be indicative that the mobile device may be at co-located at a different point than previously identified. For example, assuming that a mobile device is a wearable device in the form of a wristband or wrist watch, there may be an occasion wherein a person places such a mobile device in their jack pocket rather than wear it as intended. Hence, over time, the first measurements may be identified as being more likely to correspond to a point of the person's torso rather another point of their arm. Thus, for example, one or more transient motion profiles for different points of an object may be considered to find a more likely first point of the object co-located with the mobile device. In certain example implementations, user input(s) or feedback, or current other uses of a mobile device may be considered as being more or less likely indicative of certain points of an object. For example, if an assumption is the a mobile device is co-located with a point of the torso (perhaps near a jacket pocket or where a purse may rest when carried), however the user appears to be actively using various input/output units (e.g., a touchscreen) then is may be that the mobile device may not be located in the jacket pocket or purse, but may be closer to one or both of the person's hands. These are just a few examples and it should be understood that claimed subject matter is not necessarily intended to be so limited.

At example, block 504', one or more wireless signals representing second measurements corresponding to at least a second sensor of a wearable electronic device may be obtained (e.g., received via a receiver 410 (FIG. 4)). Here, in certain instances, as shown at example block 510, the wearable electronic device may be identified as being initially co-located with a second point of an object. By way of example, some of the example techniques has presented above with regard to block 508 may be applied here as well, again just to show a few examples.

At example block 506', at least one of an estimated speed of an object or an estimated heading or heading rate of the object may be determined. For example, at least one of an estimated speed of an object or an estimated heading or heading rate of the object may be determined based, at least in part, on at least one of the first measurements and at least one of the second measurements, in response to a determination that such first measurements and such second measurements are accepted for use. Also at example block 506', in response to a determination that one but not both of the first measurements or the second measurements is accepted for use, at least one of an estimated speed of an object or an estimated heading or heading rate of the object may be determined based, at least in part, on the one of the first measurements or the second measurements that is accepted for use. In certain instances, at example block 512, it may be further determined whether at least one of the first measurements or the second measurements is accepted for use based, at least in part, on a threshold value. In certain instances, at example block 514, it may be further determines whether at least one of the first measurements or the second measurements is accepted for use based, at least in part, on a comparison of at least the first measurements and the second measurements. In certain instances, at example block 516, a first periodicity of sensed movement or a first phase of sensed movement may be determined from the first measurements, and/or a second periodicity of sensed movement or second phase of sensed movement may be determined from the second measurements. In certain instances, at example block 518, one or more gravity vectors may be determined from one or more of the measurements accepted for use. In certain instances, at example block 520, all or part of one or more mobile device orientations may be determined. Several examples for such actions have been presented previously.

In certain example implementations, at example block 522, a navigation trajectory for the object may be determined based, at least in part, on at least one of the estimated speed of the object or the estimated heading or heading rate of the object, e.g., as determined at block 506'.

The techniques described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically motion stated otherwise, as apparent from the following discussion, it is appreciated that throughout this specification discussions utilizing terms such as "processing", "computing", "calculating", "determining", "generating", "obtaining", "modifying", "selecting", "identifying", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising, at mobile device:
    obtaining one or more electrical signals comprising first measurements from at least a first sensor, wherein the at least a first sensor is located in the mobile device, and wherein the at least a first sensor comprises a first accelerometer or a first gyroscope, the mobile device being identified as initially co-located with a first point of an object comprising a person;
    transmitting a first request from the mobile device to a first wearable electronic device of the person for second measurements and transmitting a second request from the mobile device to a second wearable electronic device of the person for third measurements, wherein the first wearable electronic device and the second wearable electronic device are physically separated from the mobile device;
    processing one or more wireless signals received by the mobile device from the first wearable electronic device and from the second wearable electronic device, the one or more wireless signals comprising the second measurements from at least a second sensor and the third measurements from at least a third sensor, wherein the at least a second sensor is located in the first wearable electronic device and the third sensor is located in the second wearable electronic device, and wherein the at least a second sensor comprises a second accelerometer or a second gyroscope, and at least one of the first wearable electronic device and the second wearable electronic device being identified as initially co-located with a second point of the object;
    determining a priority between the second measurements and the third measurements based, at least in part, on a motion model and on respective locations of a body of the person on which the first and second wearable electronic devices are located; and
    determining at least one of an estimated speed of the object, an estimated heading of the object, or an estimated heading rate of the object based, at least in part, on an inference of a pedestrian movement of the person based, at least in part, on: (i) a first periodicity of sensed movement or a first phase of sensed movement from the first measurements; (ii) a second periodicity of sensed movement or second phase of sensed movement from the second measurements and the third measurements based, at least in part, on the priority; or a combination of (i) and (ii).

2. The method as recited in claim 1, and further comprising, with the mobile device: determining whether at least one of the first measurements, the second measurements, or the third measurements is accepted for use based, at least in part, on a threshold value.

3. The method as recited in claim 2, and further comprising, with the mobile device:
    comparing the first measurements, the second measurements, or the third measurements or the first measurements and at least one of the second measurements and the third measurements to the threshold value, or applying a comparison of the first measurements and at least one of the second measurements and the third measurements to the threshold value.

4. The method as recited in claim 2, wherein the threshold value is based, at least in part, on an expected motion profile for the pedestrian movement of the person.

5. The method of claim 4, wherein the expected motion profile is based, at least in part, on the first measurements and at least one of the second measurements and the third measurements.

6. The method of claim 4, wherein the expected motion profile is based, at least in part, on a speed of arm movement in comparison to a speed of leg movement.

7. The method as recited in claim 2, wherein the threshold value is based, at least in part, on at least one of a first transient motion profile for the first point of the object, or a second transient motion profile for the second point of the object.

8. The method as recited in claim 1, and further comprising:
   selecting the second measurements or the third measurements to measure a particular characteristic; and
   powering off the first sensor at least partially in response to the selecting the second measurements or the third measurements to measure the particular characteristic.

9. The method as recited in claim 1, and further comprising:
   obtaining a comparison of the first measurements, the second measurements, or the third measurements or both the first measurements and at least one of the second measurements and the third measurements to a range of motion profile; and
   determining whether the comparison is consistent with the range of motion profile.

10. The method of claim 1, and further comprising:
    inferring that the object is performing an activity comprising movement in place based, at least in part, on at least one of the first measurements, the second measurements, and the third measurements; and
    determining the estimated speed, the estimated heading, or the estimated heading rate based, at least in part, on information other than the first measurements, the second measurements, and the third measurements in response to the inference that the object is performing the activity comprising movement in place.

11. The method as recited in claim 1, and further comprising, with the mobile device:
    determining whether at least one of the first measurements, the second measurements, or the third measurements is accepted for use based, at least in part, on a comparison of at least the first measurements and at least one of the second measurements and the third measurements.

12. The method as recited in claim 1, and further comprising, with the mobile device:
    in response to a determination that the first measurements and at least one of the second measurements or the third measurements are accepted for use, determining at least one of the estimated speed of the object, the estimated heading of the object, or the estimated heading rate of the object based, at least in part, on the first measurements and at least one of the second measurements or the third measurements.

13. The method as recited in claim 1, and further comprising, with the mobile device:
    in response to a determination that one but not both of the first measurements or the second measurements is accepted for use, determining at least one of the estimated speed of the object, the estimated heading of the object, or the estimated heading rate of the object based, at least in part, on the one of the first measurements or the second measurements that is accepted for use.

14. The method as recited in claim 1, and further comprising, with the mobile device:
    determining at least one of a first gravity vector from the first measurements, or a second gravity vector from the second measurements or the third measurements; and
    at least one of:
       determining whether at least one of the first measurements, the second measurements, or the third measurements is accepted for use based, at least in part, on at least one of the first gravity vector, or the second gravity vector; or
       determining at least one of the estimated speed of the object, the estimated heading of the object, or the estimated heading rate of the object based, at least in part, on at least one of the first gravity vector or the second gravity vector.

15. The method as recited in claim 1, and further comprising, with the mobile device:
    determining at least one of a mobile device orientation from the first measurements, or a first wearable electronic device orientation from the second measurements; and,
    at least one of:
       determining whether at least one of the first measurements or the second measurements is accepted for use based, at least in part, on at least one of the mobile device orientation, or the first wearable electronic device orientation; or
       determining at least one of the estimated speed of the object, the estimated heading of the object, or the estimated heading rate of the object based, at least in part, on at least one of the mobile device orientation, or the first wearable electronic device orientation.

16. The method as recited in claim 1, and further comprising, with the mobile device:
    determining a navigation trajectory for the object based, at least in part, on at least one of the estimated speed of the object, the estimated heading of the object, or the estimated heading rate of the object.

17. An apparatus for use in a mobile device, the apparatus comprising:
    means for obtaining one or more electrical signals comprising first measurements from at least a first sensor, wherein the at least a first sensor is located in the mobile device, the at least a first sensor comprising a first accelerometer or a first gyroscope, the mobile device being identified as initially co-located with a first point of an object comprising a person;
    means for transmitting a first request from the mobile device to a first wearable electronic device of the person for second measurements and transmitting a second request from the mobile device to a second wearable electronic device of the person for third measurements, wherein the first wearable electronic device and the second wearable electronic device are physically separated from the mobile device;
    means for processing one or more wireless signals received by the mobile device from the first wearable electronic device and from the second wearable electronic device, the one or more wireless signals comprising the second measurements from at least a second sensor and the third measurements from at least a third sensor, wherein the at least a second sensor is located in the first wearable electronic device and the third sensor is located in the second wearable electronic device, and wherein the at least a second sensor comprises a second accelerometer or a second gyroscope, and at least one of the first wearable electronic device and the second wearable electronic device being identified as initially co-located with a second point of the object;
means for determining a priority between the second measurements and the third measurements based, at least in part, on a motion model and on respective locations of a body of the person on which the first and second wearable electronic devices are located; and
means for determining at least one of an estimated speed of the object, an estimated heading of the object, or an estimated heading rate of the object based, at least in part, on an inference of a pedestrian movement of the person based, at least in part, on: (i) a first periodicity of sensed movement or a first phase of sensed movement from the first measurements; (ii) a second periodicity of sensed movement or second phase of sensed movement from the second measurements and the third measurements based, at least in part, on the priority; or a combination of (i) and (ii).

18. The apparatus as recited in claim 17, and further comprising:
means for determining whether at least one of the first measurements, the second measurements, or the third measurements is accepted for use based, at least in part, on a threshold value.

19. The apparatus as recited in claim 18, and further comprising:
means for comparing at least one of the first measurements, the second measurements, or the third measurements to the threshold value, or applying a comparison of the first measurements and the second measurements or the third measurements to the threshold value.

20. The apparatus as recited in claim 18, wherein the threshold value is based, at least in part, on an expected motion profile for the pedestrian movement of the person.

21. The apparatus as recited in claim 18, wherein the threshold value is based, at least in part, on at least one of a first transient motion profile for the first point of the object, or a second transient motion profile for the second point of the object.

22. The apparatus as recited in claim 17, and further comprising:
means for determining whether at least one of the first measurements, or the second measurements, or the third measurements is accepted for use based, at least in part, on a comparison of at least the first measurements and at least one of the second measurements and the third measurements.

23. The apparatus as recited in claim 17, and further comprising:
means for determining at least one of the estimated speed of the object, the estimated heading of the object, or the estimated heading rate of the object based, at least in part, on the first measurements and at least one of the second measurements and the third measurements, in response to a determination that the first measurements and at least one of the second measurements and the third measurements are accepted for use.

24. The apparatus as recited in claim 17, and further comprising: in response to a determination that one but not both of the first measurements or the second measurements is accepted for use, means for determining at least one of the estimated speed of the object, the estimated heading of the object, or the estimated heading rate of the object based, at least in part, on the one of the first measurements or the second measurements that is accepted for use.

25. The apparatus as recited in claim 17, and further comprising:
means for determining at least one of a first gravity vector from the first measurements, or a second gravity vector from the second measurements or the third measurements; and
at least one of:
means for determining whether at least one of the first measurements, the second measurements, or the third measurements is accepted for use based, at least in part, on at least one of the first gravity vector, or the second gravity vector; or
means for determining at least one of the estimated speed of the object, the estimated heading of the object, or the estimated heading rate of the object based, at least in part, on at least one of the first gravity vector or the second gravity vector.

26. The apparatus as recited in claim 17, and further comprising:
means for determining at least one of a mobile device orientation from the first measurements, or a first wearable electronic device orientation from the second measurements; and, at least one of:
means for determining whether at least one of the first measurements or the second measurements is accepted for use based, at least in part, on at least one of the mobile device orientation, or the first wearable electronic device orientation; or
means for determining at least one of the estimated speed of the object, the estimated heading of the object, or the estimated heading rate of the object based, at least in part, on at least one of the mobile device orientation, or the first wearable electronic device orientation.

27. A mobile device comprising:
a first sensor comprising a first accelerometer or a first gyroscope; a transmitter; a receiver; and a processing unit configured to:
obtain one or more electrical signals comprising first measurements from at least the first sensor of the mobile device, the mobile device being identified as initially co-located with a first point of an object comprising a person;
initiate transmission, via the transmitter, of a first request from the mobile device to a first wearable electronic device of the person for second measurements and initiate transmission of a second request from the mobile device to a second wearable electronic device of the person for third measurements, wherein the first wearable electronic device and the second wearable electronic device are physically separated from the mobile device;
process one or more wireless signals received, via the receiver, from the first wearable electronic device and from the second wearable electronic device, the one or more wireless signals comprising the second measurements from at least a second sensor and the third measurements from at least a third sensor, wherein the second sensor is located in the first wearable electronic device and the third sensor is located in the second wearable electronic device, the second sensor comprising a second accelerometer or a second gyroscope, and at least one of the first wearable electronic device and the second wearable electronic device being identified as initially co-located with a second point of the object;

determine a priority between the second measurements and the third measurements based, at least in part, on a motion model and on respective locations of a body of the person on which the first and second wearable electronic devices are located; and determine at least one of an estimated speed of the object, an estimated heading of the object, or an estimated heading rate of the object based, at least in part, on an inference of a pedestrian movement of the person based, at least in part, on: (i) a first periodicity of sensed movement or a first phase of sensed movement from the first measurements; (ii) a second periodicity of sensed movement or second phase of sensed movement from the second measurements and the third measurements based, at least in part, on the priority; or a combination of (i) and (ii).

28. The mobile device as recited in claim 27, the processing unit to further:
determine whether at least one of the first measurements, the second measurements, or the third measurements is accepted for use based, at least in part, on a threshold value.

29. The mobile device as recited in claim 28, the processing unit to further:
compare at least one of the first measurements, the second measurements, or the third measurements to the threshold value, or apply a comparison of the first measurements and at least one of the second measurements or the third measurements to the threshold value.

30. The mobile device as recited in claim 28, wherein the threshold value is based, at least in part, on an expected motion profile for the pedestrian movement of the person.

31. The mobile device as recited in claim 28, wherein the threshold value is based, at least in part, on at least one of a first transient motion profile for the first point of the object, or a second transient motion profile for the second point of the object.

32. The mobile device as recited in claim 27, the processing unit to further:
determine whether at least one of the first measurements or the second measurements is accepted for use based, at least in part, on a comparison of at least the first measurements and the second measurements.

33. The mobile device as recited in claim 27, the processing unit to further:
in response to a determination that the first measurements and the second measurements are accepted for use, determining at least one of the estimated speed of the object, the estimated heading of the object, or the estimated heading rate of the object based, at least in part, on the first measurements and the second measurements.

34. The mobile device as recited in claim 27, the processing unit to further:
in response to a determination that one but not both of the first measurements or the second measurements is accepted for use, determine at least one of the estimated speed of the object, the estimated heading of the object, or the estimated heading rate of the object based, at least in part, on the one of the first measurements or the second measurements that is accepted for use.

35. The mobile device as recited in claim 27, the processing unit to further:

determine at least one of a first gravity vector from the first measurements, or a second gravity vector from the second measurements; and at least one of:
determine whether at least one of the first measurements or the second measurements is accepted for use based, at least in part, on at least one of the first gravity vector, or the second gravity vector; or
determine at least one of the estimated speed of the object, the estimated heading of the object, or the estimated heading rate of the object based, at least in part, on at least one of the first gravity vector or the second gravity vector.

36. The mobile device as recited in claim 27, the processing unit to further:
determine at least one of a mobile device orientation from the first measurements, or a first wearable electronic device orientation from the second measurements; and,
at least one of:
determine whether at least one of the first measurements or the second measurements is accepted for use based, at least in part, on at least one of the mobile device orientation, or the first wearable electronic device orientation; or
determine at least one of the estimated speed of the object, the estimated heading of the object, or the estimated heading rate of the object based, at least in part, on at least one of the mobile device orientation, or the first wearable electronic device orientation.

37. A non-transitory computer readable medium having stored therein computer implementable instructions executable by a processing unit of a mobile device to:
obtain one or more electrical signals comprising first measurements from at least a first sensor of the mobile device, the at least a first sensor comprising a first accelerometer or a first gyroscope, the mobile device being identified as initially co-located with a first point of an object comprising a person;
initiate transmission of a first request from the mobile device to a first wearable electronic device of the person for second measurements and initiate transmission of a second request from the mobile device to a second wearable electronic device of the person for third measurements, wherein the first wearable electronic device and the second wearable electronic device are physically separated from the mobile device;
process one or more wireless signals received by the mobile device from the first wearable electronic device and from the second wearable electronic device, the one or more wireless signals comprising the second measurements from at least a second sensor and the third measurements from at least a third sensor, wherein the at least a second sensor is located in the first wearable electronic device, the at least a second sensor comprising a second accelerometer or a second gyroscope, and at least one of the first wearable electronic device and the second wearable electronic device being identified as initially co-located with a second point of the object;
determine a priority between the second measurements and the third measurements based, at least in part, on a motion model and on respective locations of a body of the person on which the first and second wearable electronic devices are located; and
from a wearable electronic device, determine at least one of an estimated speed of the object, an estimated heading of the object, or an estimated heading rate of the object based, at least in part, on an inference of a pedestrian movement of the person based, at least in part, on: (i) a first periodicity of sensed movement or a first phase of sensed movement from the first measurements; (ii) a second periodicity of sensed movement or second phase of sensed movement from the second measurements and the third measurements based, at least in part, on the priority; or a combination of (i) and (ii).

38. The computer readable medium as recited in claim 37, the computer implementable instructions being further executable by the processing unit of the mobile device to:
    determine whether at least one of the first measurements, the second measurements, or the third measurements is accepted for use based, at least in part, on a threshold value.

39. The computer readable medium as recited in claim 38, the computer implementable instructions being further executable by the processing unit of the mobile device to:
    compare at least one of the first measurements, the second measurements, or the third measurements to the threshold value, or apply a comparison of the first measurements and at least one of the second measurements and the third measurements to the threshold value.

40. The computer readable medium as recited in claim 38, wherein the threshold value is based, at least in part, on an expected motion profile for the pedestrian movement of the person.

41. The computer readable medium as recited in claim 38, wherein the threshold value is based, at least in part, on at least one of a first transient motion profile for the first point of the object, or a second transient motion profile for the second point of the object.

42. The computer readable medium as recited in claim 37, the computer implementable instructions being further executable by the processing unit of the mobile device to:
    determine whether at least one of the first measurements, the second measurements, or the third measurements is accepted for use based, at least in part, on a comparison of at least the first measurements and at least one of the second measurements and the third measurements.

43. The computer readable medium as recited in claim 37, the computer implementable instructions being further executable by the processing unit of the mobile device to:
    in response to a determination that the first measurements and the second measurements are accepted for use, determine at least one of the estimated speed of the object, the estimated heading of the object, or the estimated heading rate of the object based, at least in part, on the first measurements and the second measurements.

44. The computer readable medium as recited in claim 37, the computer implementable instructions being further executable by the processing unit of the mobile device to:
    in response to a determination that one but not both of the first measurements or the second measurements is accepted for use, determine at least one of the estimated speed of the object, the estimated heading of the object, or the estimated heading rate of the object based, at least in part, on the one of the first measurements or the second measurements that is accepted for use.

* * * * *